United States Patent [19]

Takai

[11] Patent Number: 4,856,025
[45] Date of Patent: Aug. 8, 1989

[54] METHOD OF DIGITAL SIGNAL TRANSMISSION
[75] Inventor: Hitoshi Takai, Hirakata, Japan
[73] Assignee: Matsushita Electric Industrial Co., Ltd., Osaka, Japan
[21] Appl. No.: 948,137
[22] Filed: Dec. 29, 1986
[30] Foreign Application Priority Data Dec. 26, 1985 [JP] Japan .................................. 60-293748
Feb. 20, 1986 [JP] Japan .................................. 61-35943
Mar. 11, 1986 [JP] Japan .................................. 61-57221

[51] Int. Cl.[4] ......................... H04B 7/02; H04L 27/18
[52] U.S. Cl. ......................................... 375/40; 375/56; 375/57; 375/85; 332/16 R; 332/23 R
[58] Field of Search ....................... 375/40, 52, 53, 54, 375/56, 57, 58, 60, 67, 83–86, 27; 370/12; 332/16 R, 23 R

[56] References Cited
U.S. PATENT DOCUMENTS 3,643,023  2/1972  Ragsdale et al. ..................... 375/53
4,215,311  7/1980  Kittel et al. ............................ 375/30
4,320,499  3/1982  Muilwijk et al. ...................... 375/53

FOREIGN PATENT DOCUMENTS 57-199356  12/1982  Japan .
58-95446   6/1983   Japan .

OTHER PUBLICATIONS

Black, H. S., "Modulation Theory", D. Van Nostrand Co., Inc., Princeton, N.J.; Aug. 1953, pp. 116–123.
"A Further Study of Anti-Multipath Modulation Technique DSK", —Analysis of Generalized DSK Modulation and Considerations for a Narrow-Band Scheme—, Faculty of Engineering, Kyoto University, CS85-108, pp. 17–24.
"A Proposal of an Anti-Multipath Modulation Technique PSK-RZ", Faculty of Engineering, Kyoto University, pp. 57–63, CS85-155.
"Bit-Error-Rate Characteristics of Rayleigh Fading Signals with Large Delay", Seizo Onoe et al., Faculty of Engineering, Kyoto University, CS81-168, pp. 41–48.
"Analysis of Error Occurring Mechanism by Observing Instantaneous BER and Bit-Synchronization System under Multipath Propagation", Hitoshi Takai et al., Faculty of Engineering, Kyoto University, CS83-158, pp. 53–60.
"A Modulation Technique Suffering from Less Timing Fluctuation of Eye Patterns in Multipath Fading", Sirikiat Ariyavisitakul et al., Faculty of Engineering, Kyoto University, CS84-67, pp. 41–47.
"Anti-Multipath Modulation Technique", Susumu Yoshida et al., —Manchester-Coded DPSK and Its Generalization—, Faculty of Engineering, Kyoto University, SAT86-22, pp. 57–62.
"A Proposal of an Anti-Multipath Modulation Technique", Hitoshi Takai et al., Wireless Research Lab. Matsushita Electric Industrail Co., Ltd., Sep. 25, 1986, SAT86-23, pp. 63–70.
"Anti-Multipath Characteristics of Manchester-Coded DPSK", Susumu Yoshida et al., Faculty of Engineering, Kyoto University, DPSK, p. 2-280.

Primary Examiner—Robert L. Griffin
Assistant Examiner—Marianne Huseman
Attorney, Agent, or Firm—Wenderoth, Lind & Ponack

[57] ABSTRACT

A modulation method capable of high-speed or high-quality digital data transmission under a multipath fading transmission line such as a radio transmission in an urban area is a type of differential coding phase modulation and residues in the fact that the rate of change of phase varies, or the phase is discrete, but does not employ a phase transition waveform of a constant value in a time slot which is a smallest unit for transmitting one symbol of data as in conventional methods. Phase transition waveforms in respective time slots which are spaced apart from each other by prescribed time slots are identical varying waveforms or discrete waveforms, and entirely shifted from each other by an amount according to the data transmitted. A detecting method employed is a differential detection method using a delay line for delaying a signal for a time corresponding to the prescribed time slots. In the presence of multipath propagation, a plurality of kinds of detected outputs are produced according to the multipath propagation, and the detected outputs are combined by a filter after the differential detection, producing a diversity effect for improving bit error rate characteristics. This digital signal transmission method is capable of multiphase transmission and can increase spectrum utilization efficiency.

22 Claims, 22 Drawing Sheets

AVERAGE BIT ERROR RATE CHARACTERISTICS
UNDER TWO-WAVE RAYLEIGH FADING

AVERAGE BIT ERROR RATE CHARACTERISTICS
UNDER TWO-WAVE RAYLEIGH FADING

AVERAGE BIT ERROR RATE CHARACTERISTICS
UNDER TWO-WAVE RAYLEIGH FADING

AVERAGE BIT ERROR RATE CHARACTERISTICS
UNDER TWO-WAVE RAYLEIGH FADING

AVERAGE BIT ERROR RATE CHARACTERISTICS
UNDER TWO-WAVE RAYLEIGH FADING

METHOD OF DIGITAL SIGNAL TRANSMISSION

BACKGROUND OF THE INVENTION

1. Field of the Invention

The present invention relates to a method of transmitting a digital signal along a multipath fading transmission line such as a radio transmission in an urban area.

2. Description of the Prior Art

In recent years, digital signal processing techniques have spread to the field of mobile communications so as to meet increasing demands for communication privacy, intelligent communication, and matching with peripheral communication networks. In urban areas where such demands are most intensive, the quality of communication is considerably lowered by multipath propagation due to reflection and diffraction caused by buildings and surrounding geographical features. In digital transmission, when the propagation delay time difference between waves constituting the multipath is increased to such an extent that it is no longer negligible with respect to the length of a time slot, the bit error rate characteristics are highly degraded by waveform distortions and follow-up failures in synchronous systems.

A first conventional digital signal transmission method will be described, by way of example, with reference to FIGS. 37 through 39.

FIG. 37 is a phase transition waveform diagram showing the phase transition of a signal transmitted by the first conventional digital transmission method. Designated at T is a time slot interval which is a minimum unit for transmitting one data symbol. When the data is a 1, a 180° C. phase transition occurs, and when the data is a 0, no phase transition takes place. This modulation technique is called differential coding BPSK (Binary Phase Shift Keying).

Such a transmitted signal can be detected, for example, by differential detection (delay line detection) using a delay line with a delay of one time slot. As a typical example of multipath, propagation consideration will be given as to how a detected output signal behaves in the presence of a two-wave multipath transmission line having a propagation delay time difference $\tau$ which is not negligible as compared with the time slot interval. A wave arriving earlier will be called a D-wave, and a delayed wave will be called a U-wave.

FIG. 38 is a diagram explaining how the detected output signal behaves when the transmitted signal as shown in FIG. 37 is subjected to the differential detection in the presence of the two-wave multipath propagation. FIG. 38(a) shows a phase transition of the D-wave. A phase transition of the U-wave which arrives with a propagation delay time difference $\tau$ from the D-wave is illustrated in FIG. 38(b). The detected output at a particular time is the vector inner product of the combined phase of the two waves at that time and the combined phase of the two waves in a preceding time slot. For example, the detected output in a region B in FIG. 38(c) is the vector inner product of the combined phase of the two waves at a time B' and that at a time B.

FIG. 39 shows the combined phase of the D- and U-waves in order to determine the detected output at each of the times A through C. The ratio of the amplitudes of the D- and U-waves is indicated by $\rho$, and the phase difference between them by $\alpha$. For example, the absolute value of the detected output at the time B is the inner product of vectors OB' and OB in FIG. 39, i.e., the square of the line segment OB. Therefore, the detected outputs at the respective times A through C in FIG. 38(c) are given, using the cosine theorem, as follows:

A . . . indefinite
B . . . $a_n(1+\rho^2+2\rho \cos \alpha)$
C . . . indefinite where $a_n$ ($a_n = \pm 1$) is a data sequence being transmitted.

In the regions A and C, the detected outputs are indefinite depending on the data values in the preceding and subsequent time slots. After the differential detection, a low-pass filter is normally placed in order to remove harmonics and undesired noise components. Therefore, the waveform of a final detected output signal is as shown by the dotted line in FIG. 38(c), which is produced by filtering the solid-line waveform of FIG. 38(c), and constitutes a portion of an eye pattern. If $\rho$ is close to 1 and $\alpha$ is about 180°, the detected output in the region B which is an effective detected output is substantially zero. Thus, the eye is closed, and the bit error rate characteristics are degraded. At this time, since the ineffective detected outputs in the regions A and C are much larger than the effective detected output in the region B, the eye is largely fluctuated in the direction of the time base, making a reproducing clock unable to follow it, and thereby resulting in a greater degration of the bit error rate (See, for example, "Bit Error Rate Characteristics in Rayleigh Fading Having a Propagation Delay Time Difference" by Onoe et al, Papers of Tech. Group on Commun. Syst., IECE JAPAN, CS81-168, 1982, or "Analysis of Instantaneous Bit Errors due to Multiwave Propagation and An Error Generating Mechanism based on A Bit Synchronous System" by Takai et al, Papers of Tech. Group on Commun. Syst., IECE JAPAN, CS83-158, 1984).

In order to reduce the degradation of the eye pattern and the fluctuation of the eye causing the degradation of the bit error rate characteristics, there has been proposed a method such that the phase transition waveform of a transmitted signal is designed so as to produce a plurality of kinds of detected outputs and the problems are improved by a diversity effect produced by combining the plurality of kinds of detected outputs. One example of such a second conventional digital signal transmission method will be described below with reference to FIGS. 40 through 43.

FIG. 40 shows the phase transition of a signal transmitted by the second conventional digital signal transmission method. T indicates one time slot for data. When the data is 1, the phase is rotated twice in one direction, each by 90° in every half time slot. When the data is a 0, the phase is rotated twice in a different direction from the above, each by 90° in every half time slot. This modulation technique is called DSK (Double Shift Keying).

Such a transmitted signal can be detected by a differential detector having a delay line with a delay of a half time slot as shown in FIG. 41. Denoted in FIG. 41 at 4101 is an input terminal, 4102 a multiplier, 4103 a half-time-slot (T/2) delay element, 4104 a low-pass filter, and 4105 an output terminal. Unlike the first conventional example, the carrier is rotated by 90° in phase by the half-time-slot delay element 4103. As with the first conventional example, consideration will be given as to how a detected output signal behaves in the presence of a two-wave multipath transmission line having a propagation delay time difference $\tau$ which is not negligible as compared with the time slot.

FIG. 42 is a diagram explanating how the detected output signal behaves when the transmitted signal as shown in FIG. 40 is subjected to the differential detection in the presence of the two-wave multipath propagation. FIG. 42(a) shows a phase transition of the D-wave. A phase transition of the U-wave which arrives with the propagation delay time difference $\tau$ from the D-wave is illustrated in FIG. 42(b). The detected output at a particular time is the vector inner product of the combined phase of the two waves at that time and a phase attained by rotating the combined phase of the two waves in a preceding half time slot by 90°. For example, the detected output in a region B in FIG. 42(c) is the vector inner product of the combined phase of the two waves at a time B and a phase attained by rotating the phase at a time B' by 90°.

FIG. 43 illustrates the combined phase of the D- and U-waves in order to determine the detected output at each of the times A through E. The ratio of the amplitudes of the D- and U-waves is indicated by $\rho$, and the phase difference therebetween by $\alpha$. For example, the absolute value of the detected output at the time B is the square of the line segment OB in view of the fact that the vector OB is perpendicular to the vector OB' in FIG. 43. Therefore, the detected outputs at the respective times A through E in FIG. 42(c) are given, using the cosine theorem, as follows:

A ... indefinite
B ... $a_n(1+\rho^2+2\rho \cos \alpha)$
C ... $a_n(1+\rho^2+2a_n\rho \sin \alpha)$
D ... $a_n(1+\rho^2+2\rho \cos \alpha)$
E ... indefinite where $a_n$ ($a_n = \pm 1$) is a data sequence being transmitted.

In the regions A and E, the detected outputs are indefinite depending on the data values in the preceding and subsequent time slots. Actually, the cut-off frequency of the low-pass filter 4104 is selected to be low enough to prevent intersymbol interference. Therefore, the output signal that has passed through the low-pass filter 4104 is produced by filtering the solid-line waveform of FIG. 42(c), and constitutes a portion of an eye pattern as shown by the dotted line in FIG. 42(c). Since the regions B, D and the region C produce complementary detected outputs as described above, the eye will not be closed. Furthermore, inasmuch as at least one of these effective detected outputs does not become smaller than the ineffective detected output in the region A or E, any fluctuation of the eye in the direction of the time base is reduced, and any degradation of the bit error rate due to a follow-up failure of a reproducing clock is small.

With the second conventional digital signal transmission method, as described above, the bit error rate characteristics are largely improved in a multipath fading transmission line by a kind of diversity effect by combining the mutually different outputs in the regions B, D and the region C, making high-speed digital transmission possible (See, for example, "A Modulation Technique Suffering from Less Timing Fluctuation of Eye Patterns in Multipath Fading" by S. Ariyavisitakul et al, Papers of Tech. Group on Commun. Syst., IECE JAPAN, CS84-67, 1984).

Because the second conventional digital signal transmission method has two phase transitions per time slot, however, it occupies a frequency bandwidth about twice that of the ordinary phase modulation, and hence is poor in frequency utilization efficiency. This method is, in principle, capable of only binary transmission, and cannot reduce the bandwidth through multivalued transmission. The band width could be reduced to a certain extent by reducing the amount of phase transition or smoothing the phase transition more than a stepped pattern, but the bit error rate characteristics would be highly degraded ("A Further Study of Anti-Multipath Modulation Technique DSK—Analysis of Generalized DSK Modulation and Considerations for a Narrow-Band Scheme" by S. Ariyavisitakul et al, Papers of Tech. Group on Commun. Syst., IECE JAPAN, CS85-108, 1985).

Furthermore, according to the second conventional digital signal transmission method, the bit error rate characteristics can no longer be improved in principle when the delay time difference $\tau$ exceeds 0.5 in terms of $\tau/T$ which is normalized with the time slot interval T. This is because in a region in which $\tau/T$ is 0.5 or more, the regions B and D disappear, and the diversity effect which would be produced by combining the two kinds of detected outputs is no longer obtained.

SUMMARY OF THE INVENTION

It is an object of the present invention to provide superior bit error rate characteristics in the presence of multipath fading and to improve frequency utilization efficiency through multi-phase transmission, or to improve bit error rate characteristics with respect to a multipath transmission line having a greater delay time difference for allowing high-speed transmission of a digital signal.

In order to achieve the above object, the present invention employs, in a transmission apparatus for transmitting digital data, a transmission signal having a phase transition waveform in each of the time slots of data, the time-slot phase transition waveform having a varying change rate of phase or a phase jump, a time-slot phase transition waveform in any desired time slot and a time-slot phase transition waveform in a time slot which comes in prescribed time slots subsequent to the desired time slot being identical to each other in shape irrespective of information to be transmitted, the information to be transmitted being present in a phase difference between the same positions of the phase transition waveforms in the time slots that are spaced apart from each other by the prescribed time slots.

By using the above transmitted signal and effecting a differential detection employing a delay element capable of delaying the signal for the prescribed time slots, different detected outputs according to multipath propagation are produced. Through a kind of diversity effect produced by combining these outputs with a low-pass filter, bit error rate characteristics are highly improved in the presence of multipath fading for allowing high-speed transmission of a digital signal. By making the phase difference transmitting the information multiphase, a multivalued transmission is rendered possible with ease for increasing frequency utilization efficiency without degrading the characteristics with respect to the multipath propagation. Dependent on the kinds of phase transition waveforms in the time slots, improvement can be also attained for a delay wave with $\tau/T > 0.5$.

The above and other objects, features and advantages of the present invention will become more apparent from the following description taken in conjunction with the accompanying drawings in which preferred embodiments of the present invention are shown by way of illustrative example.

DESCRIPTION OF THE PREFERRED EMBODIMENTS

A digital signal transmission method according to an embodiment of the present invention will hereinafter be described with reference to the drawings.

Figure 1:
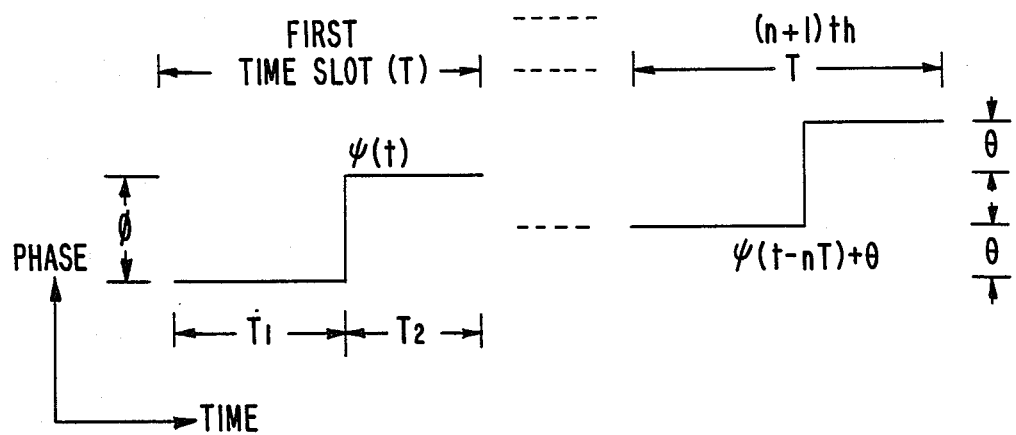
FIG. 1 is a phase transition waveform diagram showing a example of phase transition waveform of a transmission signal transmitted by a digital signal transmission method according to the present invention.

FIG. 1 is a phase transition waveform diagram showing an example of a phase transition waveform of a transmission signal transmitted by a digital signal transmission method according to the present invention;

A time-slot phase transition waveform $\psi(t)$ ($0 < t < T$) in a time slot of data is different from a conventional phase modulation method of a fixed value in that its differential coefficient is variable, or it has a phase jump. FIG. 1 shows an example in which there is a phase jump. The time-slot phase transition waveform $\psi(t)$ has a stepped pattern with a phase jump, indicated by $\phi$, between a front half portion $T_1$ and a rear half portion $T_2$. The phase transition waveforms in a first time slot and a (n+1)th time slot which are spaced apart from each other by n time slots are identical to each other in shape, and are shifted by $\theta$ according to the information to be transmitted. Stated otherwise, n-time-slot differential coding is effected. For example, when a binary-phase system with 0 and $\pi$ as $\theta$ is employed, information of one bit per time slot can be transmitted, and when a quadrature-phase system with 0, $\pi/2$, $\pi$, $3\pi/2$ as $\theta$ is employed, information of two bits per time slot can be transmitted. $\theta$ is generally indicated as follows:

$$\theta = i \cdot \frac{2\pi}{m} \quad (m = 2^p, p = 1, 2, 3 \ldots) \tag{1}$$

where i is the data value which is converted into a Gray code to be transmitted, and $0 \leq i \leq m$, i$\epsilon$ Integer. Therefore, if the phase transition waveform in the first time slot is $\omega(t)$, then the phase transition waveform in the (n+1)th time slot is expressed as $\psi(t-nT)+\theta$.

Assuming that a phase shift bearing information is indicated as a phase shift $\theta a(t)$ from the absolute phase, the phase shift $\theta a(t)$ is a stepped function having a fixed value in each time slot, and can be expressed, using a data value sequence $id_q$ produced by the n-time-slot differential coding of a data sequence $i_q$ (q$\epsilon$Integer) that has been converted to a Gray code to be transmitted, as follows:

$$\theta_a(t) = \sum_{q=-\infty}^{\infty} id_q \cdot \frac{2\pi}{m} \{U(t - qT) - U(t - (q - 1)T)\} \tag{2}$$

-continued $$U(t) = \begin{bmatrix} 1 \ (t \geq 0) \\ 0 \ (t < 0) \end{bmatrix}$$

There may be a plurality of kinds of time-slot phase transition waveforms $\psi(t)$. For the n-time-slot differential coding, n kinds of time-slot phase transition waveforms $\psi_1(t), \ldots, \psi_n(t)$ are available.

If it is assumed that $$\psi_r(t) = 0 (t \leq 0, t \geq T, 1 \leq r \leq n) \quad (3)$$

then the general formula of the phase transition waveform $\psi(t)$ of a transmission signal in the digital signal transmission method of the present invention can be expressed, using the equation (2), as follows:

$$\Psi(t) = \sum_{q=-\infty}^{\infty} \sum_{r=1}^{n} \psi_r(t - (qn + r - 1)T) + \theta_a(t) \quad (4)$$

$$= \sum_{q=-\infty}^{\infty} \sum_{r=1}^{n} \psi_r(t - (qn + r - 1)T) +$$

$$\sum_{q=-\infty}^{\infty} id_q \cdot \frac{2\pi}{m} \{U(t - qT) - U(t - (q-1)T)\}$$

The phase transition waveform of the transmission signal according to the present invention resides in the first term of the equation (4), with the second term being the same as that of the conventional differential coding phase modulation. The time-splot phase transition waveforms $\psi_1(t)$, $\psi_2(t)$, $\psi_n(t)$ may include those which are identical to each other. In a special case, all of them may be identical to each other. At any rate, the time-slot phase transition waveforms $\psi(t)$ that are spaced from each other by the n time slots need to be identical to each other. The value of n may be 1, and in such a case, the time-slot phase transition waveforms $\psi(t)$ are of one kind, and the phase transition waveforms in all of the time slots are of identical shape. Where the time-slot phase transition waveforms $\psi(t)$ are of one kind, the phase transition waveform $\Psi(t)$ of the transmission signal is expressed, using the equation (2), as follows:

$$\Psi(t) = \sum_{q=-\infty}^{\infty} \psi(t - qT) + \theta_a(t) \quad (5)$$

$$= \sum_{q=-\infty}^{\infty} \psi(t - qT) + \sum_{q=-\infty}^{\infty} id_q \cdot$$

$$\frac{2\pi}{m} \{U(t - qT) - U(t - (q-1)T)\}$$

FIG. 1 shows the stepped time-slot phase transition waveform $\psi(t)$ as described above. A duty ratio $T_1/T$ indicating the position of a phase jump 100 may be of any desired value. The duty ratio may of course be 50%, that is, the phase jump $\phi$ may be located centrally in the time slot. The phase jump $\phi$ may be of any desired magnitude and may be leading or lagging in phase. In a special case, the phase jump $\phi$ may be $\pi$. As described later on, as the phase jump $\phi$ is larger, i.e., it is closer to $\pi$, the characteristics under multipath fading are improved, but the envelope with a limited band varies to a large extent.

Figure 2:
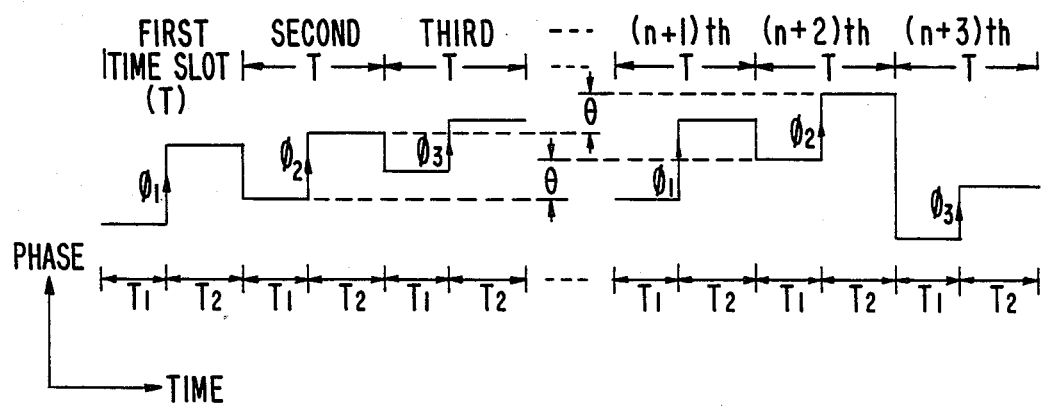
FIGS. 2 through 12 are phase transition waveform diagrams showing examples of phase transition waveforms of transmission signals transmitted by a digital signal transmission method according to the present invention.
Figure 3:
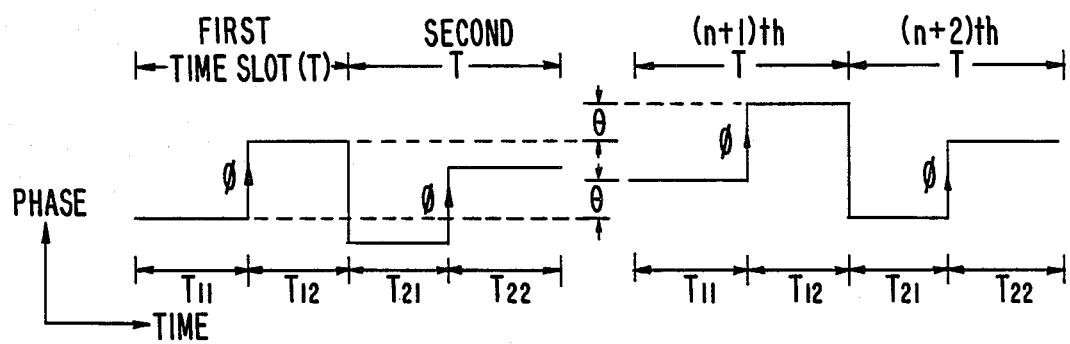
Figure 4:
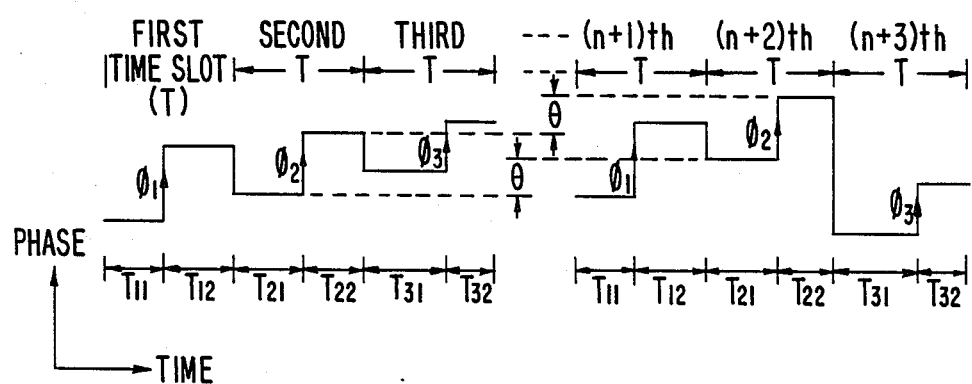
Figure 5:
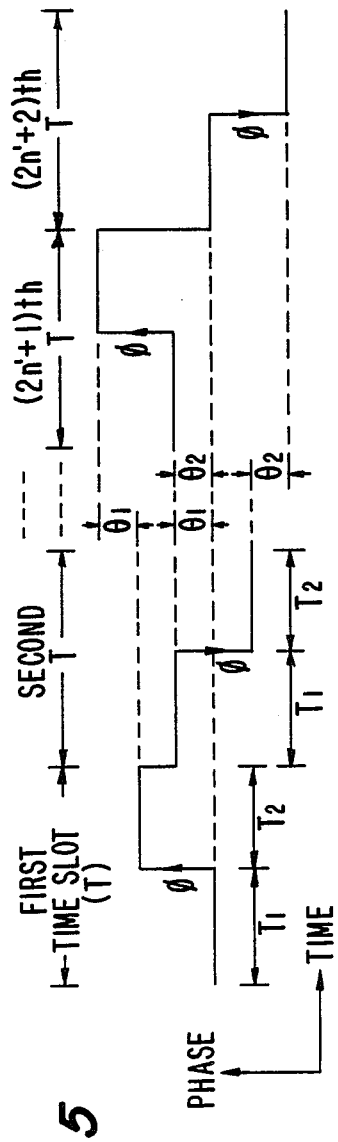
Figure 6:
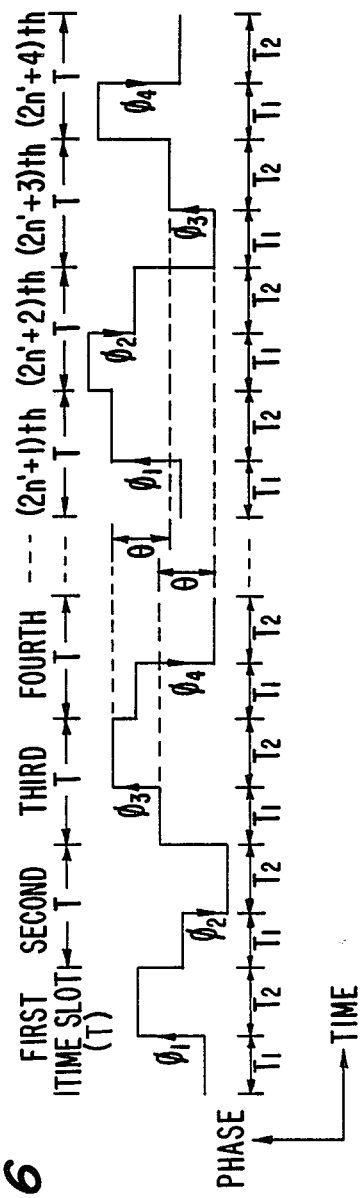
Figure 7:
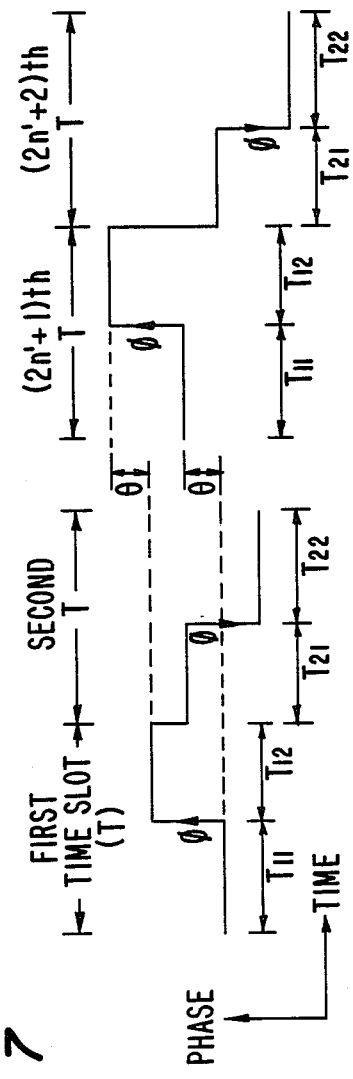
Figure 8:
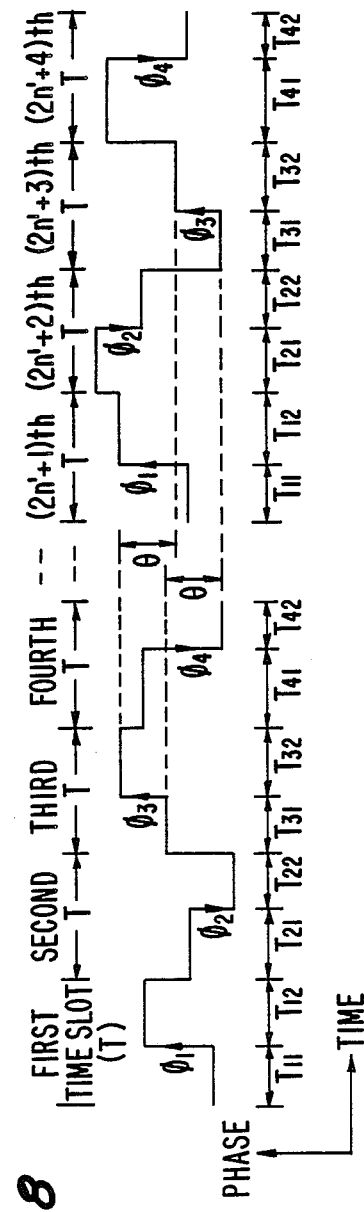
Figure 9:
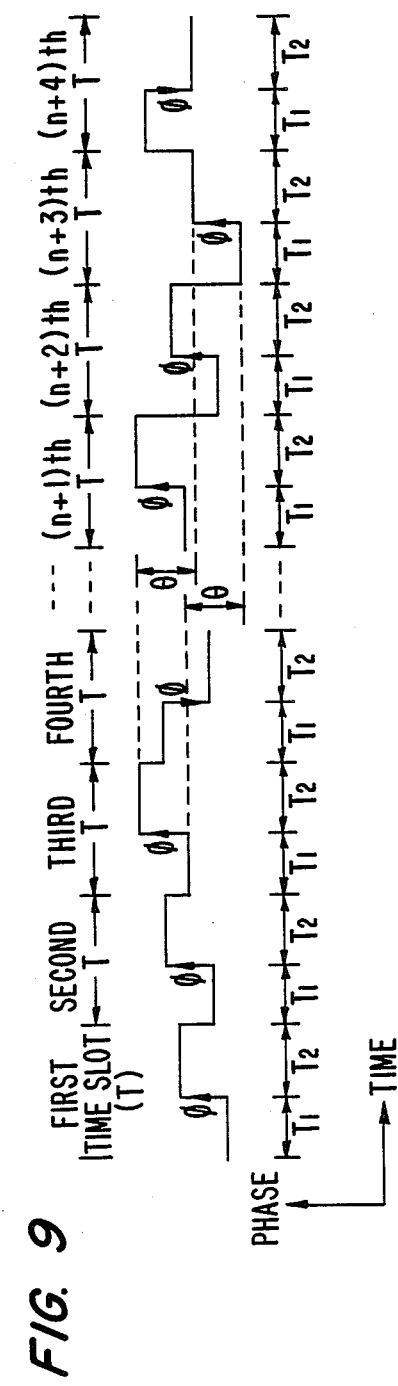
Figure 10:
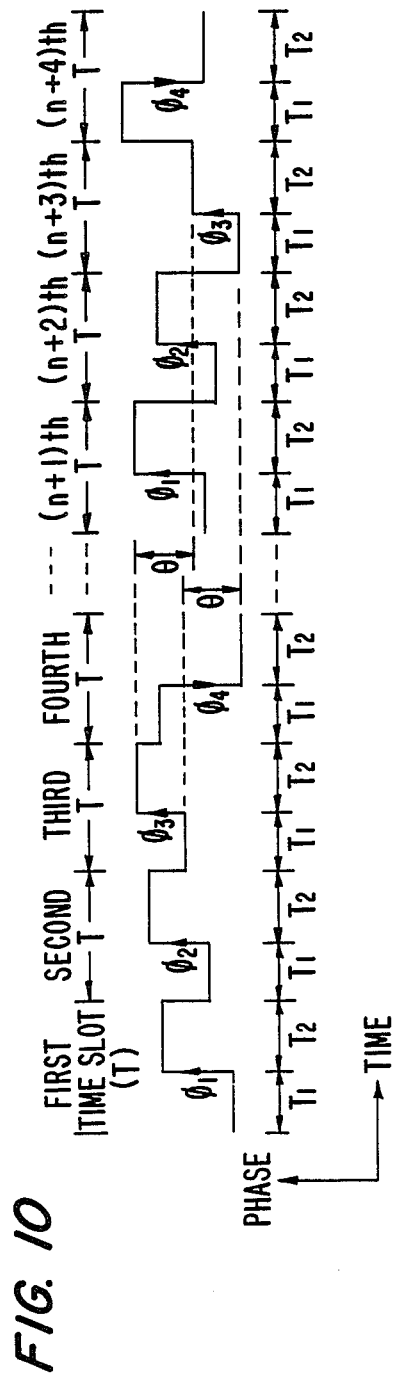
Figure 11:
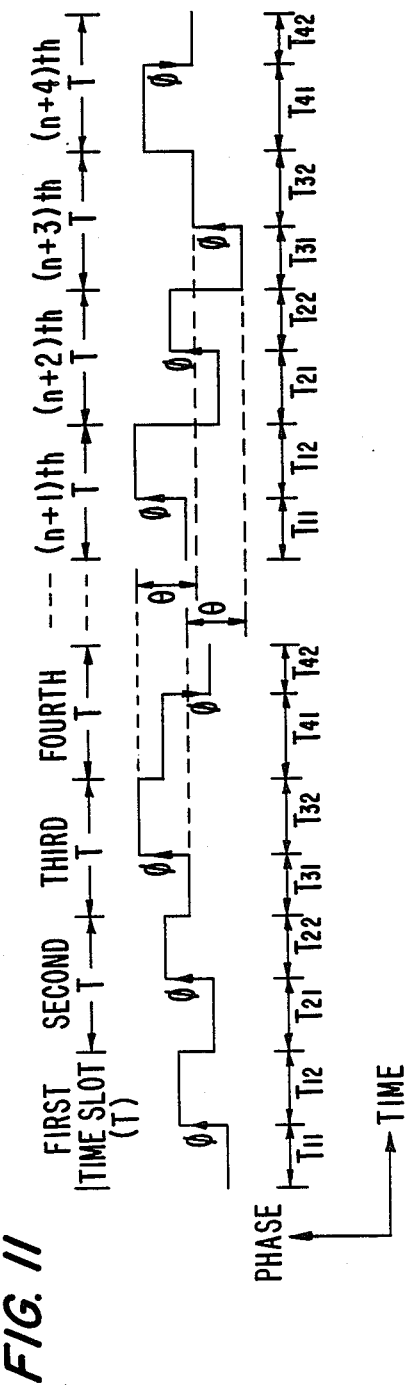
Figure 12:
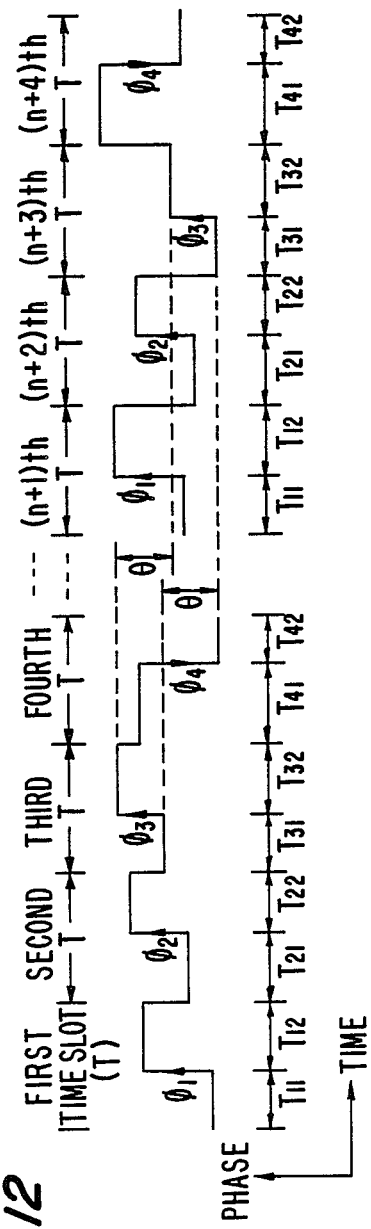

As described above, there may be a plurality of kinds of time-slot phase transition waveforms $\psi(t)$. FIG. 2 shows a case in which there are a plurality of kinds of phase jumps $\phi$. FIG. 3 shows a case in which there are a plurality of kinds of duty ratios. FIG. 4 illustrates a case in which there are a plurality of kinds of combinations of phase jumps $\phi$ and duty ratios. FIG. 5 shows a case in which the transition directions of phase jumps $\phi$ are alternately leading and lagging. FIG. 6 illustrates a case in which there are a plurality of kinds of magnitudes of phase jumps $\phi$, and FIGS. 7 and 8 show cases in which there are a plurality of kinds of duty ratios, with the distance n between corresponding time slots being of an even number and indicated by 2n'. FIG. 9 shows a case in which the transition directions of phase jumps $\phi$ constitute a quasirandom binary sequence having a period equal to the distance n between corresponding time slots. FIG. 10 shows a case in which there are a plurality of kinds of magnitudes of phase jumps $\phi$, and FIGS. 11 and 12 show cases in which there are a plurality of kinds of duty ratios.

Figure 13:
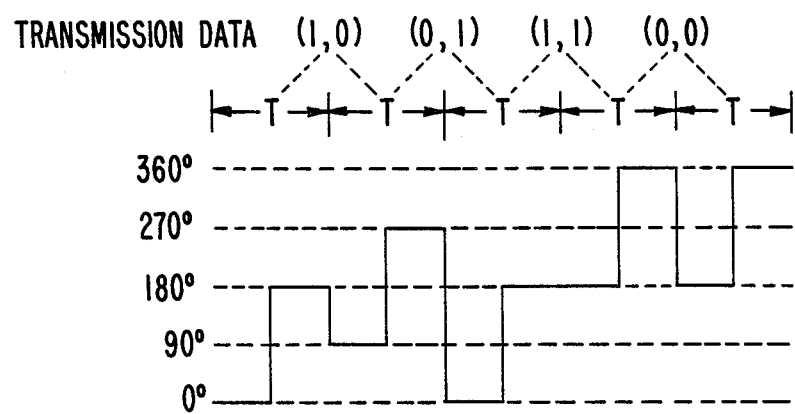
FIG. 13 is a phase transition waveform diagram showing a specific example of phase transition waveform of a transmission signal transmitted by a digital signal transmission method according to the present invention.

FIG. 13 is a phase transition waveform diagram showing the phase transition waveform of a transmission signal transmitted by a digital signal transmission method of the present invention, in which the time-slot phase transition waveforms $\psi(t)$ are of one kind and of a stepped pattern with the duty ratio being 50% and the phase jump $\phi = \pi$, and in which n=1, i.e., one time-slot differential coding, and multiphase number m=4, so that two bits can be transmitted per time slot.

Figure 14:
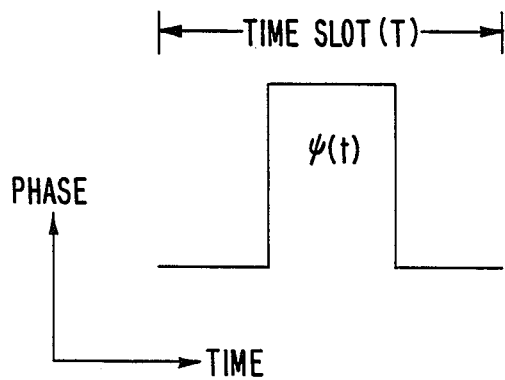
FIGS. 14 through 18 are phase transition waveform diagrams of other examples of phase transition waveforms in a time slot of FIG. 1.
Figure 15:
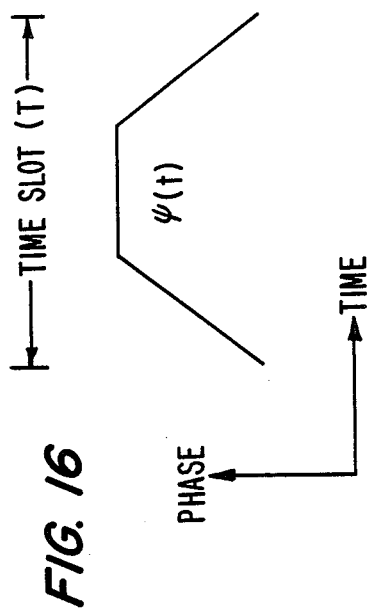
Figure 16:
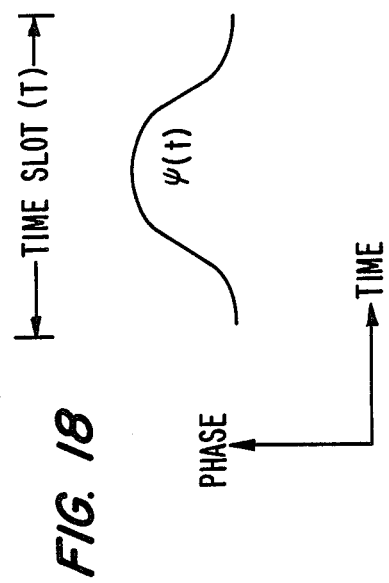
Figure 17:
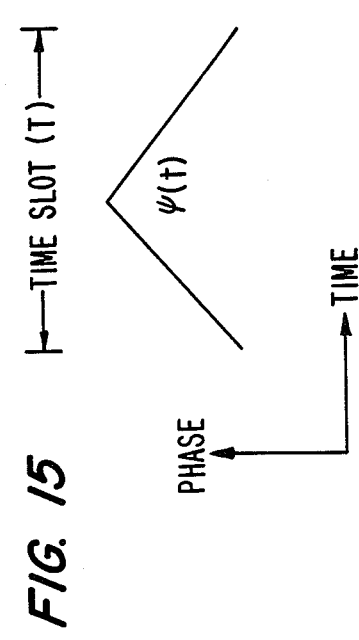
Figure 18:
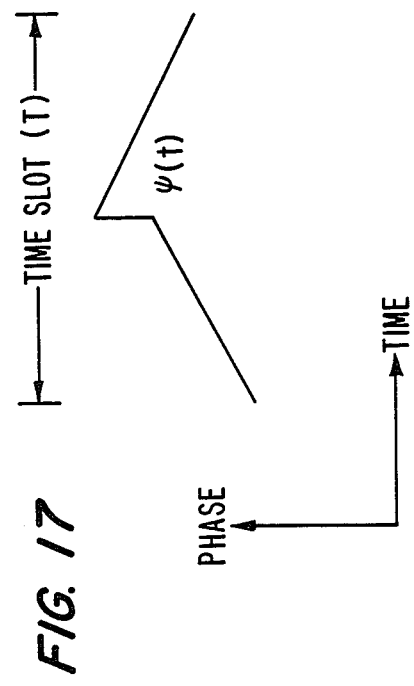

The time-slot phase transition waveforms $\psi(t)$ may have a plurality of steps as shown in FIG. 14. The time-slot phase transition waveforms $\psi(t)$ may be of a triangular shape as shown in FIG. 15, instead of the stepped pattern. The gradient of straight lines constituting the phase transition waveform corresponds to a frequency shift from the carrier frequency. Therefore, for the example of FIG. 15, one time slot is composed of two frequencies. The gradient of straight lines constituting the time-slot phase transition waveform may be of various kinds as shown in FIG. 16, and may have a phase jump as shown in FIG. 17. Furthermore, in order to reduce the transmission spectral width, the phase transition waveform may be of a pattern produced by smoothing any one of the above-mentioned waveforms. For example, it may be of a raised cosine waveform or a Gaussian waveform as shown in FIG. 18.

A method of producing the transmission signal as described above will hereinafter be described with reference to embodiments of the invention.

Figure 19:
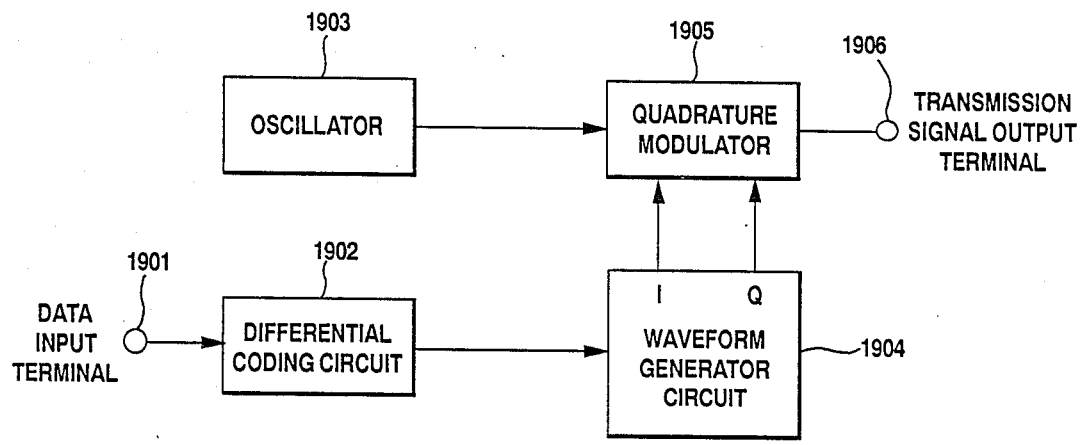
FIG. 19 is a block diagram of a generator circuit for a transmission signal according to a first embodiment of the present invention.

FIG. 19 is a block diagram of a generator circuit for a transmission signal according to a first embodiment of the present invention. Designated in FIG. 19 at 1901 is a data input terminal element 1902 is a differential coding circuit element, 1903 is an oscillator; element 1904 is a waveform generator circuit; element 1905 is a quadrature modulator, and element 1906 is a transmission signal output terminal. Digital data to be transmitted is supplied from the data input terminal 1901 and subjected to differential coding in the differential coding circuit 1902. The waveform generator circuit 1904 generates modulation signals in I- and Q-phases according to the differential coded data. The oscillator 1903 produces a carrier, which is modulated by the modulation signals in the I- and Q-phases in the quadrature modulator 1905 into a transmission signal that is outputted from the transmission signal output terminal 1906.

Figure 20:
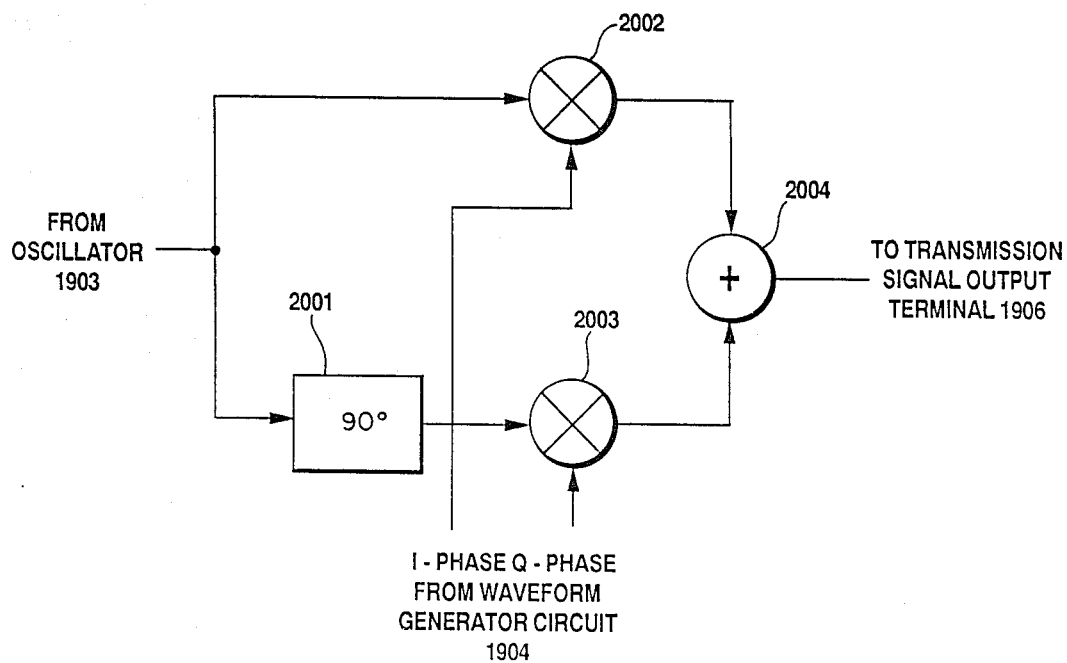
FIG. 20 is a block diagram of a circuit arrangement of a quadrature modulator 1905 as shown in FIG. 19.

FIG. 20 shows a circuit arrangement of the quadrature modulator 1905 shown in FIG. 19. Denoted in FIG. 20 at 2001 is a 90° phase shifter; elements 2002 and 2003 are balanced modulators, and element 2004 is a combiner. The carrier signal supplied from the oscillator 1903 is modulated by the I-phase modulation signal from the waveform generator circuit 1904, using the balanced modulator 2002, into an I-phase modulated signal. The carrier signal is also phase-shifted by 90° by the 90° phase shifter 2001, and then modulated by the Q-phase modulation signal from the waveform generator circuit 1904, using the balanced modulator 2003, into a Q-phase modulated signal. The I- and Q-phase modulated signals thus produced are combined by the combiner 2004 into a modulated transmission signal, which is outputted from the transmission signal output terminal 1906.

Figure 21:
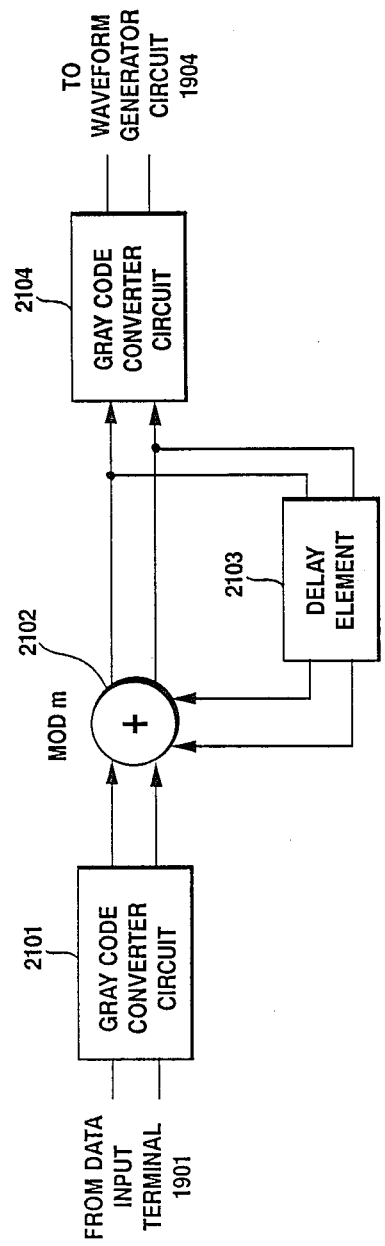
FIG. 21 is a block diagram of a circuit arrangement of a differential coding circuit 1902 as shown in FIG. 19.

FIG. 21 illustrates a circuit arrangement of the differential coding circuit 1902 shown in FIG. 19. Denoted at 2101 and 2104 are Gray code converter circuits; element 2102 is an adder, and element 2103 a delay element. When the multiphase number is m (m=2, 4, 8 . . . ), a p-bit parallel data value sequence indicated by the equation (1) is applied to the Gray code converter circuit 2101. The data value sequence $i_q$ that has been converted into a Gray code is applied to the adder 2102 in which it is added (MOD m) to data which has been produced by delaying the output of the adder 2102 by the delay element 2103 for the n time slots, i.e., n clock pulses. The output from the adder 2102 is converted by the Gray code converter circuit 2104. Therefore, the p-bit input parallel data value sequence is converted into a Gray code to produce a p-bit parallel data value sequence $id_q$ subjected to n time-slot differential coding.

Figure 22:
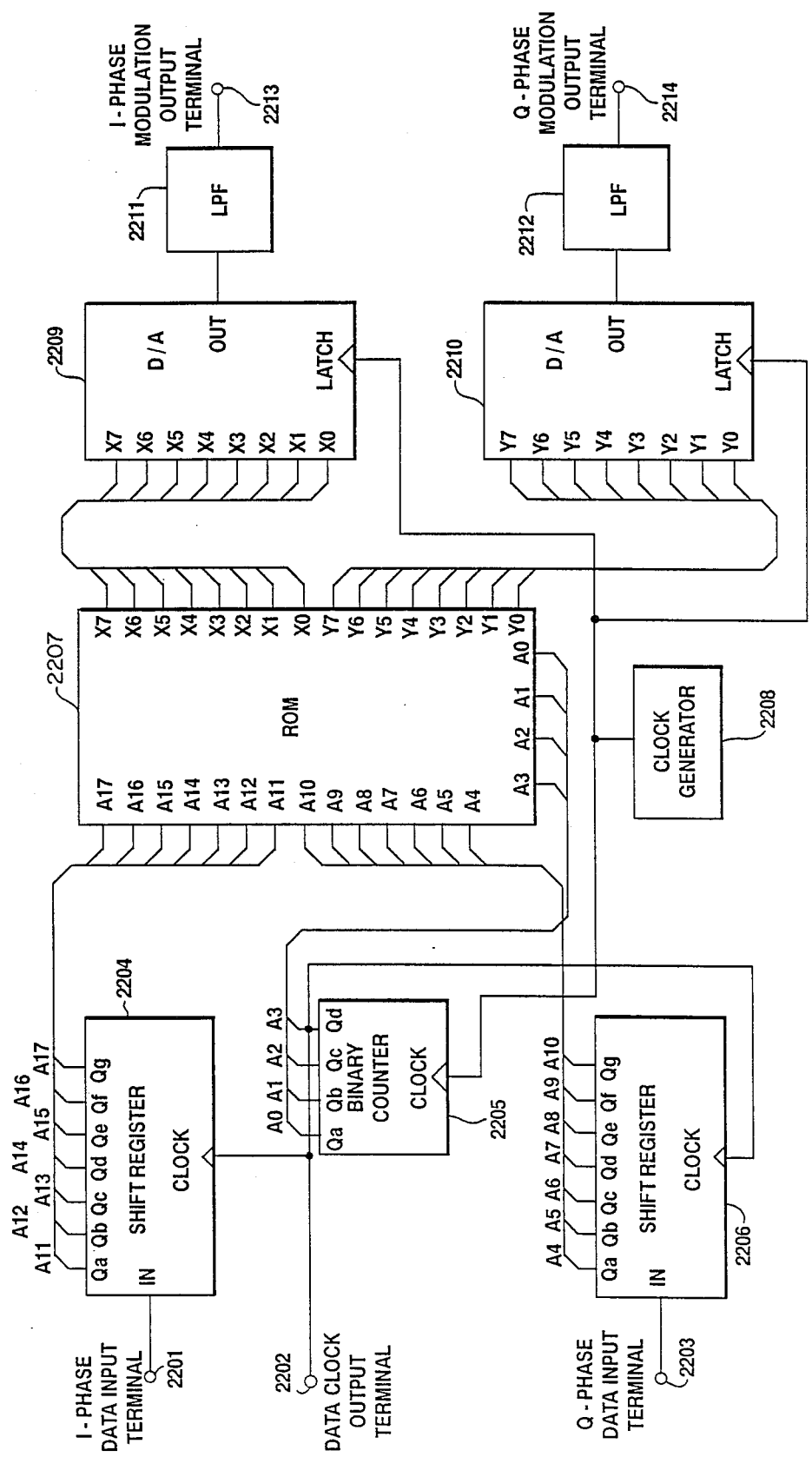
FIG. 22 is a block diagram of a circuit arrangement of a waveform generator circuit 1904 as shown in FIG. 19.

FIG. 22 is illustrative of a circuit arrangement of the waveform generator circuit 1904 with respect to a quadrature-phase system in which the phase transition waveform $\Psi(t)$ is indicated by the equation (5). Designated at 2201 is an I-phase data input terminal; element 2202 is a data clock output terminal; element 2203 is a Q-phase data input terminal; elements 2204 and 2206 are shift registers; element 2205 is a binary counter; element 2207 is a ROM (Read-Only Memory); element 2208 is a clock generator; elements 2209 and 2210 are D/A converters; elements 2211 and 2212 are low-pass filters; element 2213 is an I-phase modulation output terminal, and element 2204 is a Q-phase modulation output terminal. For the quadrature-phase system, the output $id_q$ from the differential coding circuit 1902 is 2-bit parallel data with its most- and least-significant bits being supplied from the I- and Q-phase data input terminals 2201 and 2203, respectively. The supplied data sequences are delayed respectively by the shift registers 2204 and 2206 to provide modulating data in the present time slot and modulating data in time slots subsequent to and preceding the present time slot. In FIG. 22, the shift registers 2204 and 2206 produce at Qd the modulating data in the present time slot, and at Qe through Qg and Qa through Qc the modulating data in the three time slots subsequent to and preceding the present time slot. The I- and Q-phase modulating waveforms are written in the ROM 2207 according to the modulating data. In FIG. 22, each time slot is composed of 16 sampling points. Addresses A7 through A17 of the ROM 2207 are used as select signals for determining which modulating data is to be detected, and are supplied with the modulating data in the three time slots subsequent to and preceding the present time slot. To addresses A0 through A3 of the ROM 2207, there is applied a signal, as a modulating-waveform readout signal, which is produced by frequency-dividing a reference clock signal from the clock generator 2208 with the binary counter 2205. The ROM 2207 produces outputs X0 through X7 and Y0 through Y7 which are converted into analog signals by the D/A converters 2209 and 2210 and the low-pass filters 2211 and 2212 which remove folded components, the analog signals serving as the I- and Q-phase modulating signals. For modulation in a more multi-phase system such as an octal-phase system, it is necessary to have as many shift registers as the number of p in the equation (1) and corresponding ROM addresses.

The modulating waveform in each time slot which is written in the ROM 2207 will be described below. Basically, the I- and Q-phase modulating waveforms $M_I(t)$, $M_Q(t)$ may be obtained by the following equations from the phase transition waveform $\Psi(t)$ of the transmission signal which is derived by the equation (5) from the data value sequence $id_q$ subjected to the differential coding and to be transmitted:

$$M_I(t) = \cos \Psi(t)$$

$$M_Q(t) = \sin \Psi(t) \tag{6}$$

Since these waveforms are wideband signals as they are, they are limited to bandwidth by a band-limiting filter having an impulse response h(t). The equations (6) are then modified as follows:

$$M_I(t) = \int_{-to}^{+to} \cos \Psi(t - \tau) \cdot h(\tau) d\tau \tag{7}$$

$$M_Q(t) = \int_{-to}^{+to} \sin \Psi(t - \tau) \cdot h(\tau) d\tau$$

Various band-limiting filters capable of passing lower frequencies, such as of the cosine-square type or the Gaussian type, may be employed. Such various filters have different impulse responses h(t). As an example, the impulse response h(t) of a cosine-square type filter having a cut-off angular frequency $\omega_o$ and a roll-off coefficient $\gamma$ is given by:

$$h(t) = \frac{\omega_o}{\pi} \cdot \frac{\sin \omega_o t}{\omega_o t} \cdot \frac{\cos \gamma \omega_o t}{1 - (2\gamma \omega_o t/\pi)^2} \tag{8}$$

The cut-off angular frequency $\omega_o$ should be selected to be about the same as the modulation rate which is a reciprocal of the time slot interval T.

In the ROM 2207 shown in FIG. 22, there are written the I- and Q-phase modulating waveforms $M_I(t)$ and $M_Q(t)$ for one time slot according to the equations (7). The range of integration (-to, to) in the equations (7) is selected to be about the same as the spread of the impulse response h(t), and is equal to the three time slots subsequent to and preceding the present time slot in the arrangement of FIG. 22. The modulating data in the three time slots subsequent to and preceding the present time slot are required in order to calculate the phase transition waveform $\Psi(t)$ from the equation (5). Therefore, the waveform data for one time slot is calculated by the equations (7) with respect to all of the modulating data patterns in the present time slot and the three time slots subsequent to and preceding the present time slot, and is written in the ROM 2207. A modulating waveform is selected by the addresses A4 through A17 of the ROM 2207 which are the modulating data in the present time slot and the three time slots subsequent to and preceding the present time slot.

This is substantially the case with a plurality of kinds of phase transition waveforms $\Psi(t)$ in the time slots just like the time-slot phase transition waveform $\psi(t)$ is indicated by the equation (4). The I- and Q-phase modulating waveforms $M_I(t)$, $M_J(t)$ for one time slot, as calculated by the equations (7), may be written in the ROM. In determining $\Psi(t)$ in the equations (7) from the equation (4), it is necessary to find the value of r ($1 \leq r \leq n$) in the time-slot phase transition waveform $\psi_r(t)$ in the present time slot. Therefore, the waveform datas to be written in the ROM are calculated with respect to not only the modulating data patterns but also representative of which one is the time-slot phase transition waveform $\psi_r(t)$ in the present time slot.

Figure 23:
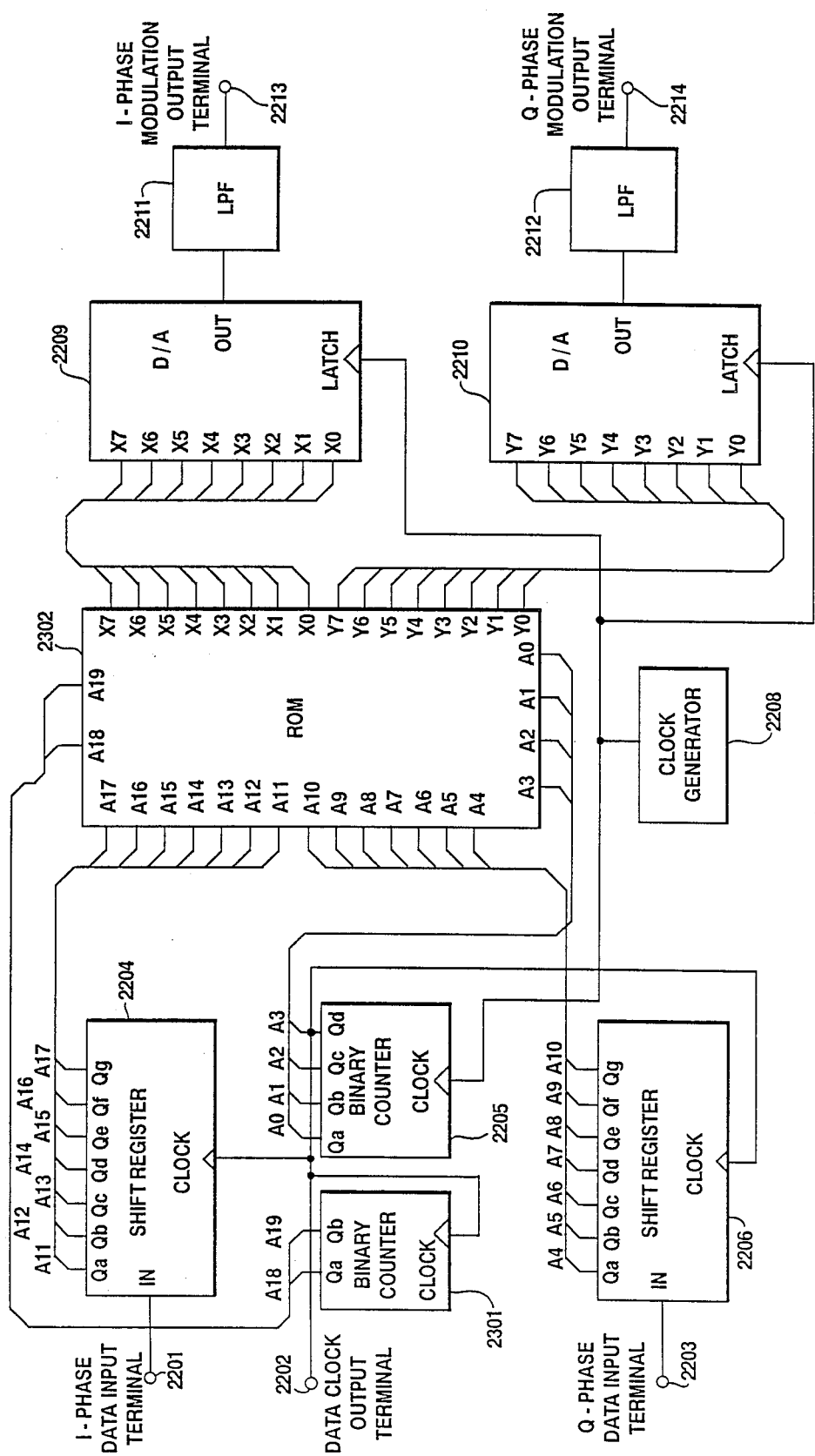
FIG. 23 is a block diagram of another circuit arrangement of the waveform generator circuit 1904 as shown in FIG. 19.

Accordingly, the circuit arrangement of the waveform generator 1904 shown in FIG. 19 must be modified as shown in FIG. 23. Denoted in FIG. 23 at 2201 is an I-phase data input terminal; element 2202 is a data clock output terminal; element 2203 is a Q-phase data input terminal; elements 2204 and 2206 are shift registers; element 2205 is a binary counter; element 2208 is a clock generator; elements 2209 and 2210 are D/A converters; elements 2211 and 2212 are low-pass filters; element 2213 is an I-phase modulation output terminal, and element 2214 is a Q-phase modulation output terminal. These components are the same as those shown in FIG. 22. The circuit arrangement of FIG. 23 differs from that of FIG. 22 in that a binary counter 2301 indicating the present value of r is added, and addresses A18 and A19 are added to a ROM 2302 for selecting a waveform according the value of r. The binary counter 2301 has a period n, which is 4 in the arrangement of FIG. 23.

A method of detecting a transmission signal in the digital signal transmission method of the present invention, as described above, will be described below.

In the digital signal transmission method of present invention, a signal is detected by a differential detector having a delay line for n time slots. This detecting method is the same as the conventional method, and described in detail, for example, in "Data Transmission", by William R. Bennet and James R. Davey, McGraw-Hill Book Co. New York, 1965. The detecting method will be described briefly hereinbelow.

Figure 24:
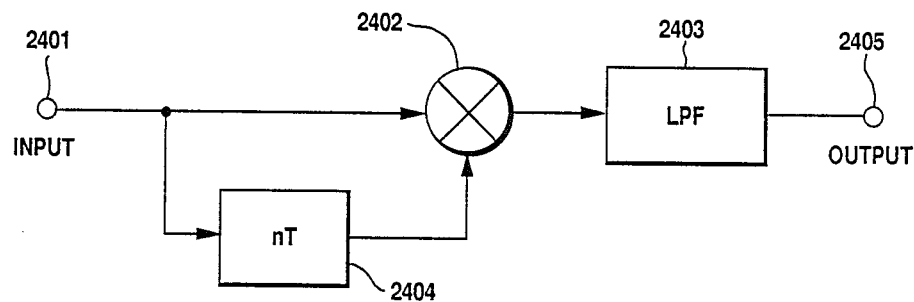
FIG. 24 is a block diagram of a differential detector of a binary-phase system.

FIG. 24 illustrates a circuit arrangement of a differential detector of a binary-phase system. Designated in FIG. 24 at 2401 is an input terminal, 2402 a multiplier, 2403 a low-pass filter, 2404 an n-time-slot (nT) delay element, and 2405 an output terminal. The signal is delayed for the n time slots by the n-time-slot delay element 2404. Unlike the second conventional arrangement, the carrier phase remains identical at the input and output. The low-pass filter 2403 not only removes a component having a frequency which is twice as high as that of the carrier produced by the multiplier 2402, but also serves to combine a plurality of detected outputs. The low-pass filter 2403 is preferably a so-called Nyquist filter having a cut-off frequency that is half the symbol transmission rate, i.e., $(\frac{1}{2})T$, and also having attenuation characteristics asymmetrical with respect to the cut-off frequency.

Figure 25:
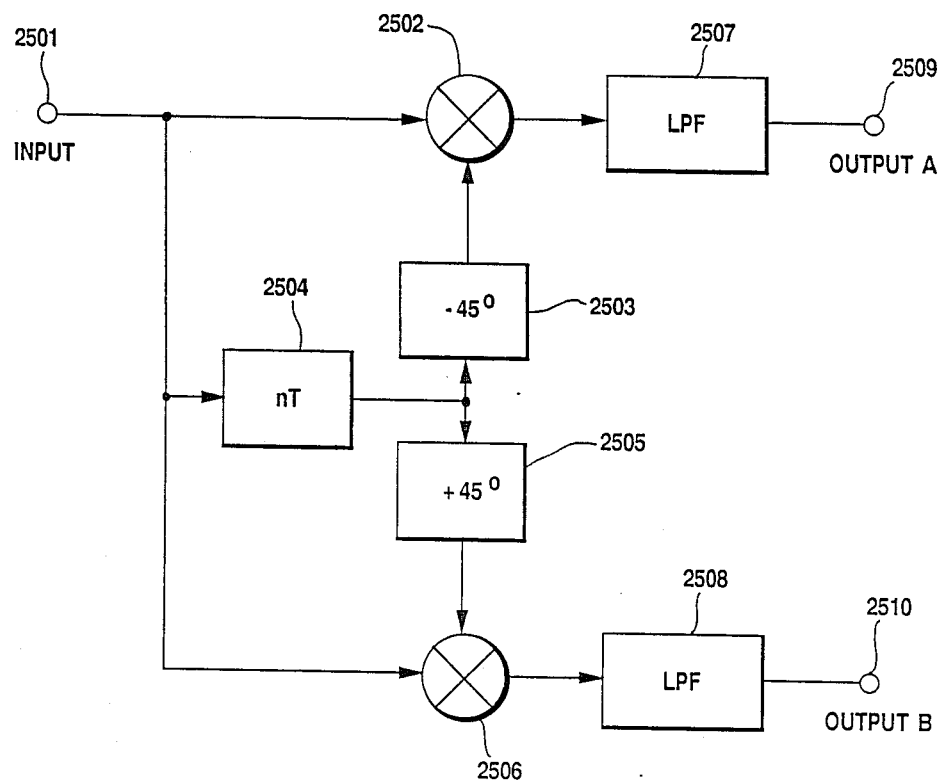
FIG. 25 is a block diagram of a differential detector of a quadrature-phase system.

FIG. 25 shows a circuit arrangement of a differential detector of a quadrature-phase system. Denoted in FIG. 25 at 2501 is an input terminal; elements 2502 and 2506 are multipliers; element 2503 is a $-45°$ phase shifter; element 2505 is a $+45°$ phase shifter; element 2504 is an n-time-slot (nT) delay element; elements 2507 and 2508 are low-pass filters; element 2509 is an output terminal A, and element 2510 is an output terminal B. The circuit arrangement of FIG. 25 differs from that of FIG. 24 in that the $-45°$ phase shifter 2503 and the $+45°$ phase shifter 2505 are employed to effect differential detection with respect to two mutually perpendicular axes for demodulating 2-bit parallel data. The other operation is the same as that of the circuit arrangement of FIG. 24.

Figure 26:
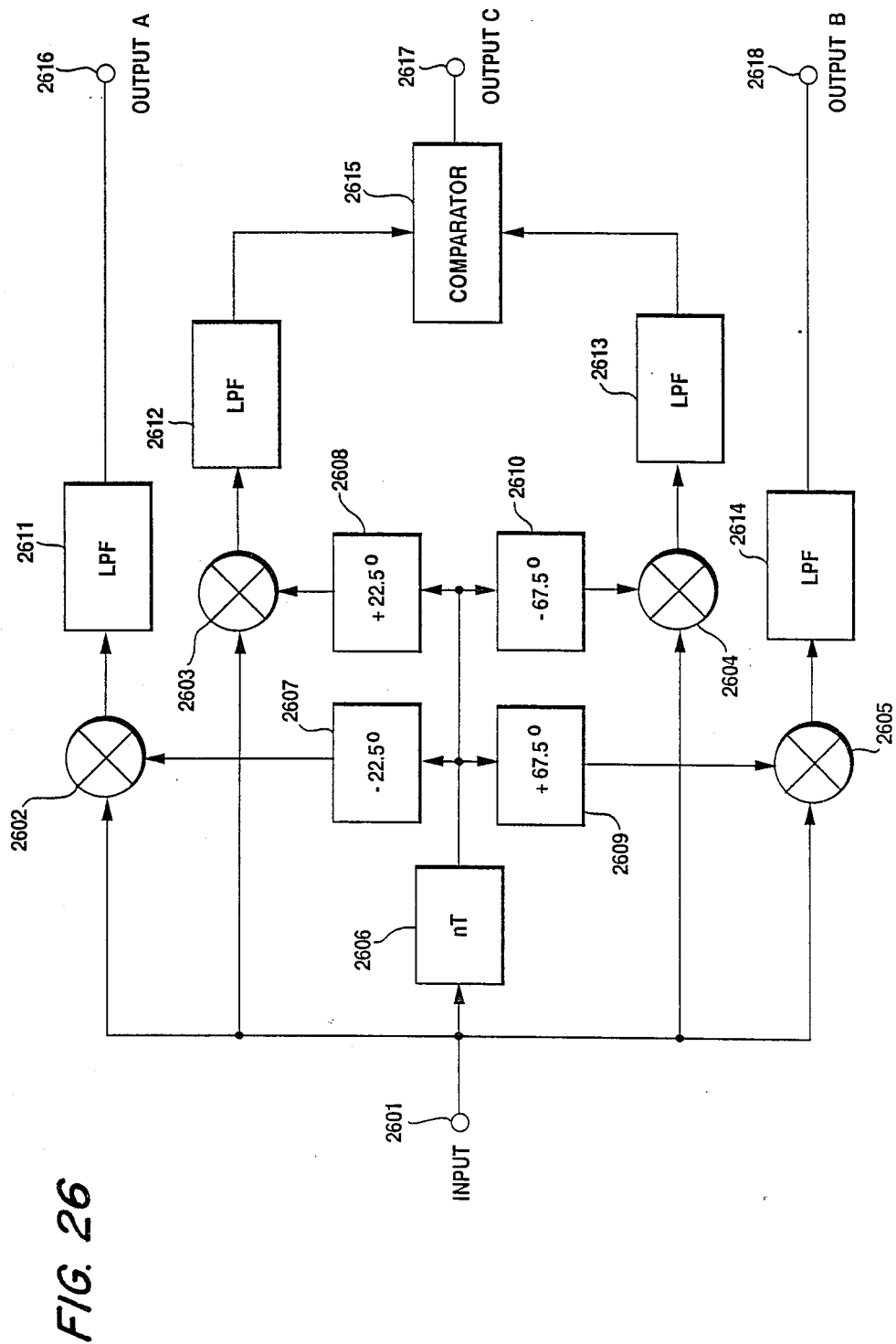
FIG. 26 is a block diagram of a differential detector of an octal-phase system.

FIG. 26 shows a circuit arrangement of a differential detector of an octal-phase system. Denoted in FIG. 26 at 2601 is an input terminal; element 2602 through 2605 are multipliers; element 2606 is an n-time-slot (nT) phase shifter; element 2607 is a $-22.5°$ phase shifter; element 2608 is a $+22.5°$ phase shifter; element 2609 is a $+67.5°$ phase shifter; element 2610 is a $-67.5°$ phase shifter; elements 2611 through 2614 are low-pass filters; element 2615 is a comparator; element 2616 is an output terminal A; element 2617 is an output terminal C, and element 2618 is an output terminal B. The phase shifters 2607 through 2610 serve to effect differential detection with respect to three axes which are 45° displaced for demodulating 3-bit parallel data. The comparator 2615 detects whether or not both inputs applied thereto are of the same polarity or not.

The manner in which the digital signal transmission method of the present invention exhibits good bit error rate characteristics in the presence of multipath fading will be described below.

Figure 27:
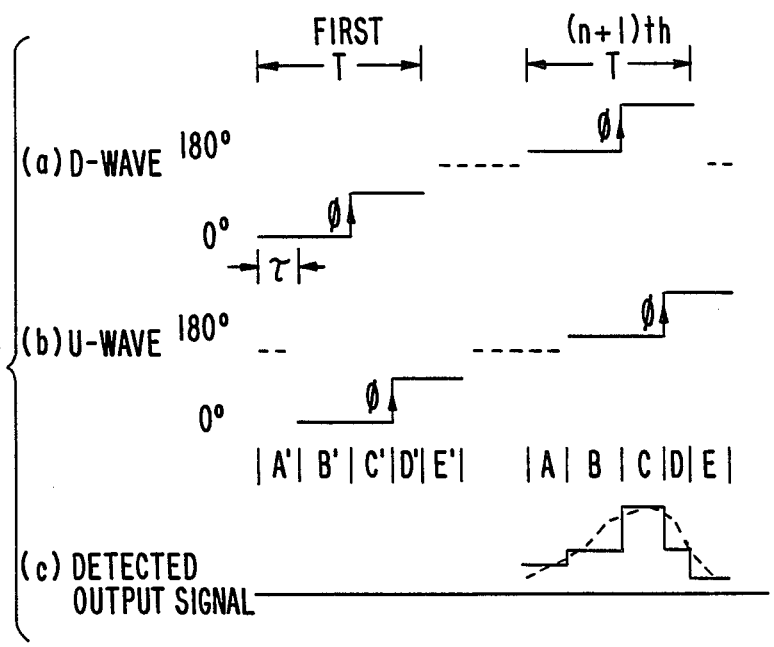
FIG. 27 is a diagram explaining a detected output signal in the presence of a two-wave multipath propagation in a digital signal transmission method of the present invention.

FIG. 27 is a diagram in which a transmission system of a binary-phase system having stepped time-slot phase transition waveforms as shown in FIG. 1 is employed as a transmission signal to be transmitted by the digital signal transmission method of the invention, and explains a detected output signal produced by detecting such a transmission signal with the differential detector of FIG. 24. FIG. 27(a) shows the manner of D-wave phase transition of a time slot and a time slot which is n time slots subsequent to the former time slot. The time-slot phase transition waveforms in both of the time slots are of an identical stepped pattern as described above. The phase transition of the U-wave which comes with a time delay equal to the propagation delay time difference $\tau$ that is not negligible as compared with the time slot interval T is as shown in FIG. 27(b). The detected output at a particular time is the vector inner product of the combined phase of two waves at that time and the combined phase of the two waves in a time which is the n time slots prior to the above time. For example, the detected output in a region B in FIG. 27(c) is the vector inner product of the combined phase of the two waves at a time B' and that at a time B.

Figure 28:
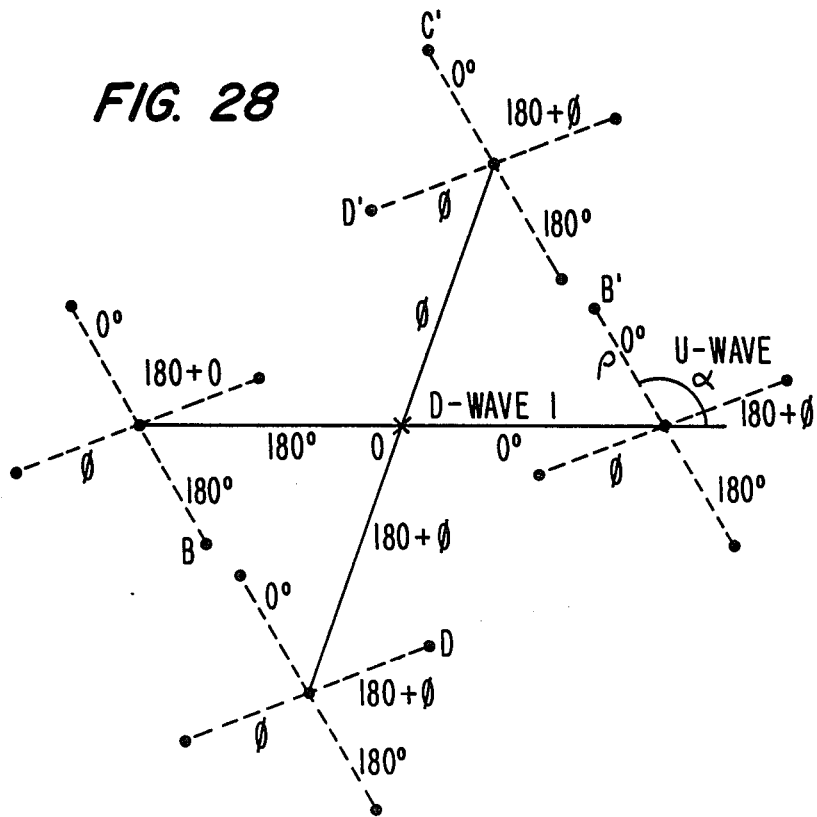
FIG. 28 is a vector diagram illustrating the combined phase of D- and U-waves in order to determine the detected output in FIG. 27.

FIG. 28 shows the combined phase of the D- and U-waves in order to determine the detected output at each of the times A through E. The ratio of the amplitudes of the D- and U-waves is indicated by $\rho$, and the phase of the carrier of the U-wave as seen from the carrier of the D-wave is indicated by $\alpha$. The phase axis of FIGS. 27(a) and 27(b) is such that the leading direction is positive. Based on FIG. 28, when the waveform is not distorted by the low-pass filter 2403, or the cut-off frequency is sufficiently high as compared with the data transmission rate, the detected outputs at the respective times A through E in FIG. 27(c) are as follows:

Regions A, E (9)

indefinite

-continued

Regions B, D $1 + \rho^2 + 2\rho \cos \alpha$

Region C $1 + \rho^2 + 2\rho \cos(\alpha - \phi)$

In the regions A and E, the detected outputs are rendered indefinite depending on the data values in the preceding and subsequent time slots. Actually, the cut-off frequency of the low-pass filter 2403 is selected to be low enough to prevent intersymbol interference. Therefore, the output signal that has passed through the low-pass filter 2403 is produced by filtering the solid-line waveform of FIG. 27(c), and constitutes a portion of an eye pattern as shown by the dotted line in FIG. 27(c). Since the regions B, D and the regions C produce complementary detected outputs and will not be simultaneously eliminated with respect to any value of $\rho$ or $\alpha$, the eye will not be closed. Furthermore, inasmuch as at least one of these effective detected outputs does not become smaller than the ineffective detected output in the region A or E, any fluctuation of the eye in the direction of the time base is reduced, and any degradation of the bit error rate due to a follow-up failure of a reproducing clock is small.

Detected outputs under two-wave multipath propagation, including a multiphase system, will be considered. Assuming that a transmission data sequence is $a_n(a_n = \pm 1)$, a multiphase number is m (m=2, 4, 8, ...), and complex multiplicative noises indicating fading of the D- and U-waves are $s_1(t)$ and $s_2(t)$, the detected outputs in the regions B, C, D can be expressed as follows (the complex envelopes of the D- and U-waves are expressed by $s_1 \cdot v$, $s_2 \cdot v$ where $v(|v|=1)$ is the complex envelope of a transmitted wave):

Regions B, D  (10)

$a_n \sin(\pi/m) \cdot (|s_1 + s_2|^2)$

Region C $a_n \sin(\pi/m) \cdot (|s_1 \exp(j\phi) + s_2|^2)$

It should be noted in the equations (10) that the carrier phase of the D-wave in the detected output of the region C is shifted by $\phi$.

As described above, the principle of the present invention for improving a digital signal transmission in the presence of multipath fading can be said to be a kind of diversity effect by combining different detected outputs. Therefore, an appropriate diversity model can be considered for evaluating bit error rate characteristics. Now, a bit error rate in the presence of two-wave multipath fading which meets the condition of a delay time difference $\tau$ with the both regions B, D and region C being present will be evaluated.

Figure 29:
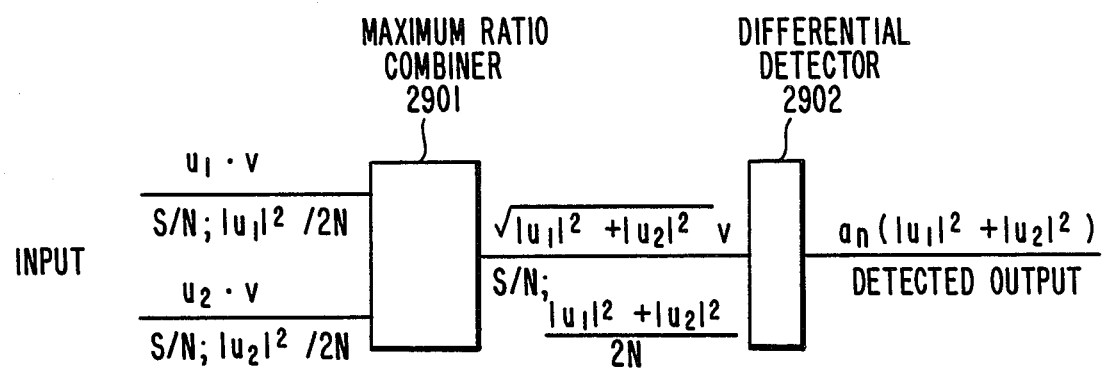
FIG. 29 is a block diagram of a diversity model in the presence of multipath propagation in a digital signal transmission method of the present invention.

A model of a maximum ratio combiner 2901 supplied with, as two branch inputs, signals $u_1 \cdot v$, $u_2 \cdot v$ (v is the complex envelope of a modulated signal, $|v|=1$) accompanied by fading expressed by complex multiplicative noises $u_1(t)$, $u_2(t)$, and a differential detector 2902, as shown in FIG. 29, will be considered. In the maximum ratio combiner 2901, the sum of S/N ratios of the inputs is equal to the S/N ratio of the output (where N is noise power). Therefore, at this time, the complex envelope of the received signal at the input of the differential detector 2902 is indicated by $$\sqrt{|u_1|^2 + |u_2|^2} \cdot v,$$

and the detected output from the differential detector 2902 is given by:

$$a_n(|u_1|^2 + |u_2|^2) \quad (11)$$

When the two detected outputs in the equation (10) are combined equally, the first and second terms of the equation (11) correspond to the two detected outputs of the equation (10), and are expressed by:

$$u_1 = \sqrt{\sin(\pi/m)} \cdot (s_1 + s_2) \quad (12)$$

$$u_1 = \sqrt{\sin(\pi/m)} \cdot (s_1 \exp(j\phi) + s_2)$$

Thus, it will be understood that FIG. 29 shows a diversity model employing stepped time-slot phase transition waveforms in the digital signal transmission method of the present invention in the presence of two-wave multipath fading. The equations (12) indicate that the diversity effect, strictly speaking, has, at diversity branches, a combined wave of coming waves having the delay time difference $\tau$ and a combined wave of those coming waves with the carrier phase difference between them being shifted by $\phi$.

The diversity characteristics employing the maximum ratio combiner can analytically be evaluated. Assuming that R is a complex variance matrix $$< \frac{u_i}{\sqrt{N}}, \frac{u_j}{\sqrt{N}} > (i, j = 1, 2) \text{ of } \{u_i/\sqrt{N}\} (i = 1, 2),$$

the average bit error rate Pe when the S/N ratio is large is expressed by the following equation, as described in "Communication Systems and Techniques", by M. Schwartz and W. R. Bennett and S. Stein, McGraw-Hill Book Company, New York, 1966:

$$Pe = \frac{1}{2 \cdot \det R} \quad (13)$$

Assuming that the fading of the D-wave and the fading of the U-wave are independent of each other and the average D/U ratio is 0dB, det R is calculated as follows:

$$\det R = \{\gamma \sin(\pi/m) \cdot \sin(\phi/2)\}^2 \quad (14)$$

$\gamma = S/N$ ratio

Therefore, the average bit error rate Pe is:

$$Pe = \frac{1}{2 \cdot \{\gamma \sin(\pi/m) \sin(\phi/2)\}^2} \quad (15)$$

Thus, from the viewpoint of the bit error rate, the optimum value of $\phi$ is $\pi$, and the average bit error rate is degraded twice at $\pi/2$ and seven times at $\pi/4$. With respect to the effect on the multiphase number m, the average bit error rate for quadrature-phase system is degraded twice that for binary-phase system and the average bit error rate for octal-phase system is degraded seven times that for binary-phase system. According to the paper "A Further Study of Anti-Multipath Modulation Technique DSK—Analysis of Generalized DSK Modulation and Considerations for a Narrow-Band Scheme" by S. Ariyavisitakul et al, Papers of Tech. Group on Commun. Syst., IECE JAPAN, CS85-108, 1985, the average bit error rate $Pe_{DSK}$ of $\theta$-DSK which is calculated by the same method and is a generalization of DSK discussed as the second conventional digital signal transmission method is expressed by:

$$Pe_{DSK} = \frac{1}{2 \cdot \{\gamma \sin\theta \cdot \sin(\theta/2)\}^2} \quad (16)$$

Comparison of the equations (15), (16) shows that the former is different from the latter in that the parameter $\phi$ which dominates the diversity effect is separated from the amount of phase transition $\pi/m(\theta)$ for delivering information. Therefore, by selecting $\phi$ to be of an optimum value $\pi$, the digital signal transmission method of the present invention can produce better characteristics than those of the conventional digital signal transmission methods, particularly DSK, i.e., the second conventional arrangement. For example, the quadrature-phase digital signal transmission method with $\phi=\pi$ of this invention has bit error rate characteristics equal to those of $\pi/2$-DSK which is the second conventional digital signal transmission method, and has frequency utilization efficiency about twice that of the conventional method since the method of this invention is capable of quadrature-phase transmission while the conventional method is capable of only binary-phase transmission. Thus, the digital signal transmission method of this invention has better bit error rate characteristics and it is capable of multiphase transmission.

The aforesaid analysis has been made with reference to two wave multipath fading, but can easily be extended to multiwaves. For example, when three waves are involved, there are three detected outputs, and the model shown in FIG. 29 has three branches, resulting in much better characteristics. Diversity branches are also increased when a plurality of waveforms are employed as time-slot phase transition waveforms $\psi(t)$.

While the present invention has been described above with stepped waveforms employed as the time-slot phase transition waveforms $\psi(t)$, it is easily extended to any desired different waveforms.

Figure 30:
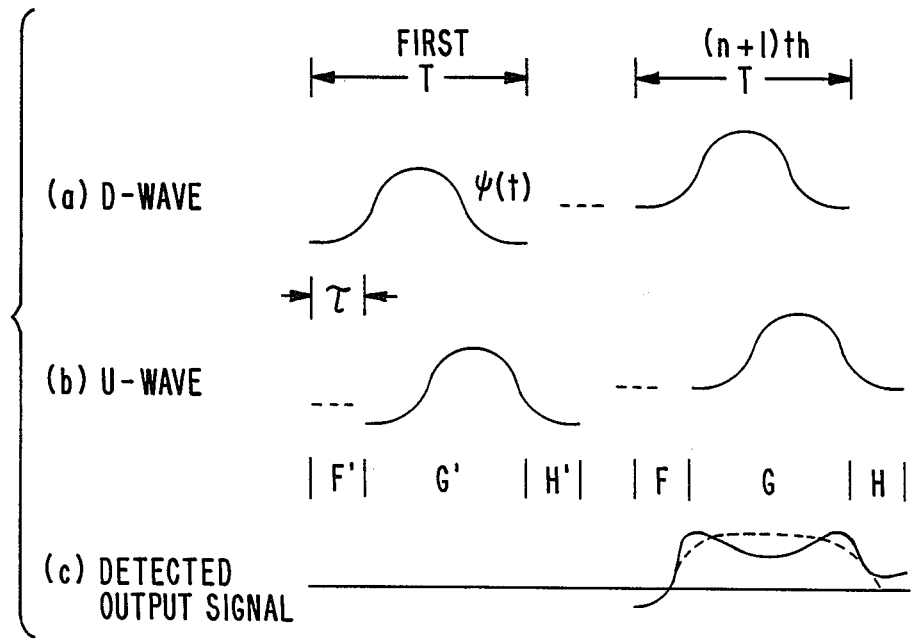
FIG. 30 is a diagram explanating a detected output signal in the presence of a two-wave multipath propagation in a digital signal transmission method of the present invention.

FIG. 30 is a diagram illustrative of a detected output in the presence of two-wave multipath propagation, as with FIG. 27, with respect to any time-slot phase transition waveforms $\psi(t)$. Like the exmaple of FIG. 27, the detected output is roughly classified into three regions F, G, H, the regions A, E corresponding to the regions F, H, respectively. In these regions, the output is an ineffective detected output and has a polarity which does not necessarily coincide with the value of data transmitted. The regions B, C, D correspond to the region G. In this region, the output is an effective detected output and has a polarity which necessarily coincides with the value of data transmitted. Although there is no definite divisions in the region G, different types of detected outputs appear as indicated by the solid line in FIG. 30(c). The waveform shown by the solid line in FIG. 30(c) is filtered by a low-pass filter to form a portion of an eye pattern as indicated by the dotted line in FIG. 30(c).

The detected output in the region G can be expressed, with z used as a parameter, similarly to the equation (10), as follows:

Region G (17)

$$a_n \sin(\pi/m) \cdot (|s_1 \exp\{j\psi(z)\} + s_2 \exp\{j\psi(z-\tau)\}|^2) =$$

$$a_n \sin(\pi/m) \cdot (|s_1 \exp[j\{\psi(z) - \psi(z-\tau)\}] + s_2|^2)$$

where $\tau \leq z \leq T$

Thus, insofar as the time-slot phase transition waveforms $\psi(t)$, which meet the condition:

$$\psi(z) - \psi(z-\tau) \neq \text{const.}(\tau - z \leq T) \quad (18)$$

the equation (17) is not constant, and it can be seen that bit error rate characteristics in the presence of multipath fading can be improved by the kind of diversity effect produced by combining different detected outputs. The condition of the equation (18) indicates that the time-slot phase transition waveforms $\psi(t)$ have a varying rate of change of phase or a phase jump.

When the raised cosine waveform or Gaussian waveform as shown in FIG. 18 is employed, the spectrum utilization efficiency is good; stated otherwise, greater protection against band limitations is obtained.

Examples of the average bit error rate characteristics in the presence of two-wave Rayleigh fading having a delay time difference will be described with reference to typical examples of the digital signal transmission method of this invention.

Figure 31:
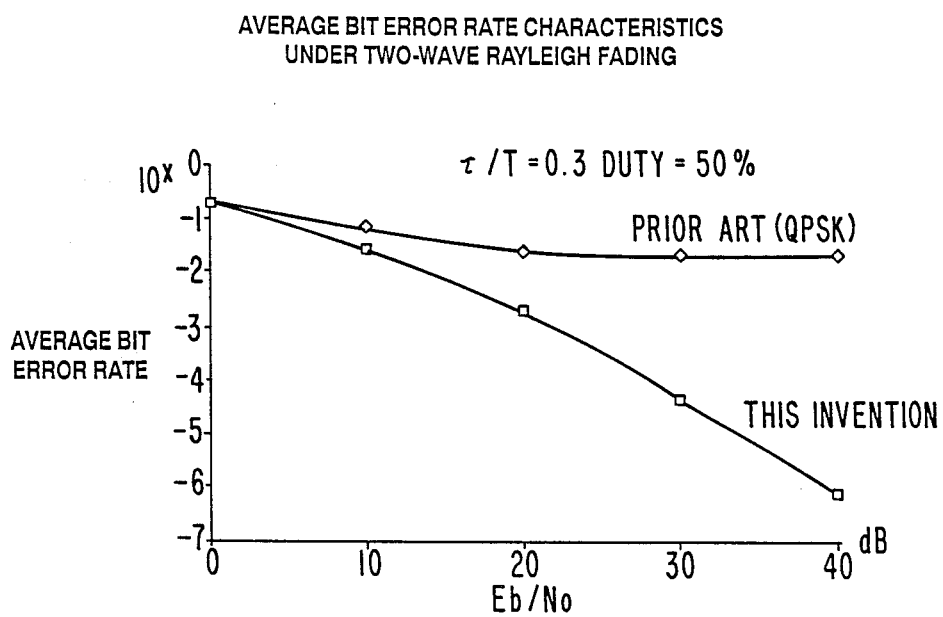
FIGS. 31 through 35 are graphs showing average bit error rate characteristics according to the present invention in the presence of two-wave Rayleigh fading.

FIG. 31 is a graph in which the time-slot phase transition waveforms are of one type in the form of a stepped pattern having one phase jump $\phi(\phi=\pi)$ at the center of the time slots as shown in FIG. 1, the graph showing average bit error rate characteristics for the quadrature-phase system with respect to the S/N ratio. The average bit error rate characteristics of the conventional digital signal transmission method, QPSK (Quadrature Phase Shift Keying), are also shown in the same graph for comparison. As shown in FIG. 31, in QPSK, errors are produced that cannot be reduced even by increasing the S/N ratio. According to the digital signal transmission method of this invention, no such phenomenon occurs, and the bit error rate characteristics are highly improved.

Figure 32:
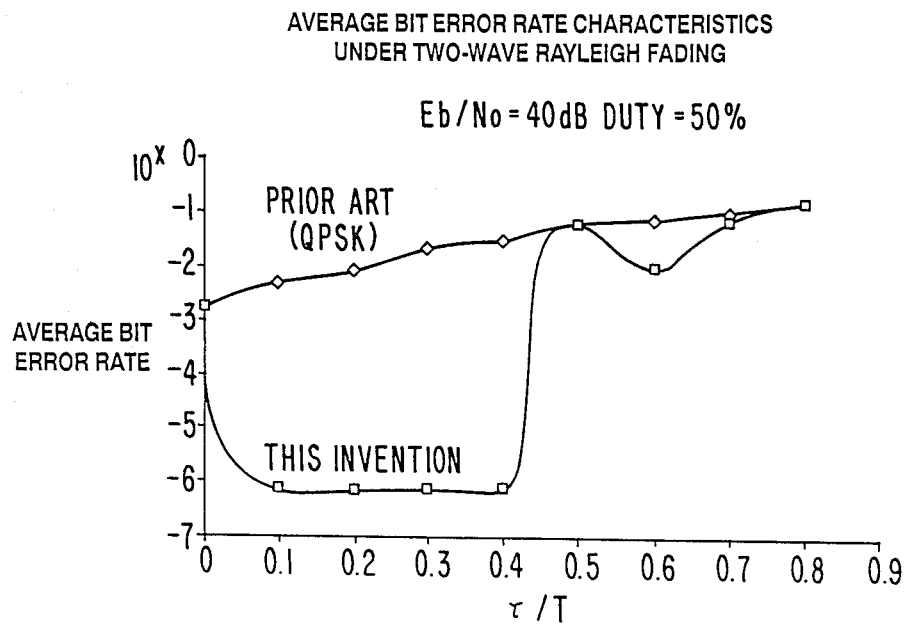

FIG. 32 similarly shows an average bit error rate with respect to the delay time difference $\tau$. In the range of $0 < \tau/T < 0.5$, the average bit error rate is improved to a great extent. At $\tau/T = 0$ or $\tau/T \geq 0.5$, no improvement is achieved, and the characteristics are closer to those of QPSK because the region C or the regions B, D disappear in FIG. 17, losing the diversity effect.

Figure 33:
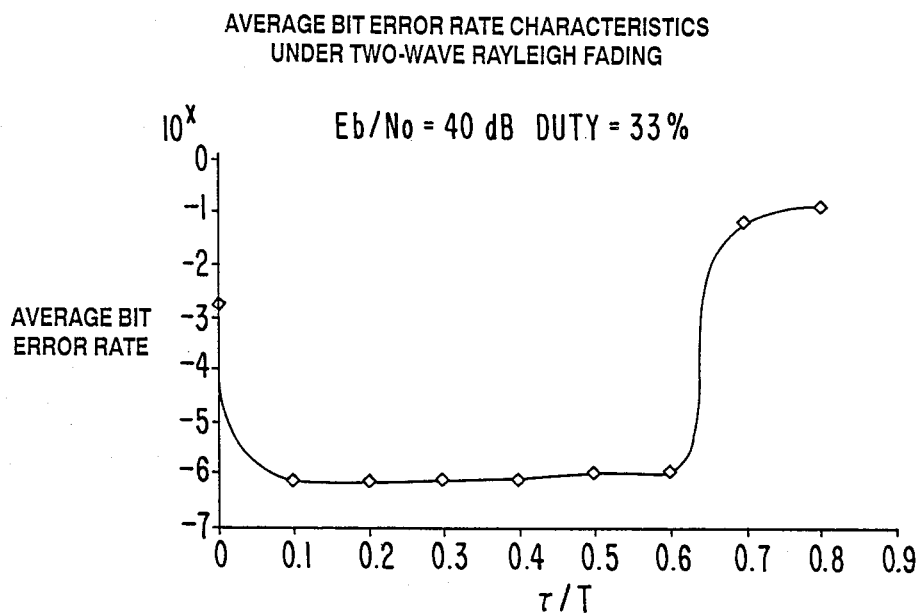

The bit error rate can be improved with respect to a large value of $\tau/T$ by shifting the position of the phase jump $\phi$ from the center of the time slots. FIG. 33 shows an average bit error rate with respect to the delay time difference $\tau$ when the phase jump $\phi$ is positioned at an internally divided point in the ratio 1:2. The bit error rate can be improved thereby up to the range of about $\tau/T < 0.7$. With DSK discussed as the second conventional method, it is impossible in principle to improve the bit error rate at $\tau/T \geq 0.5$.

Figure 34:
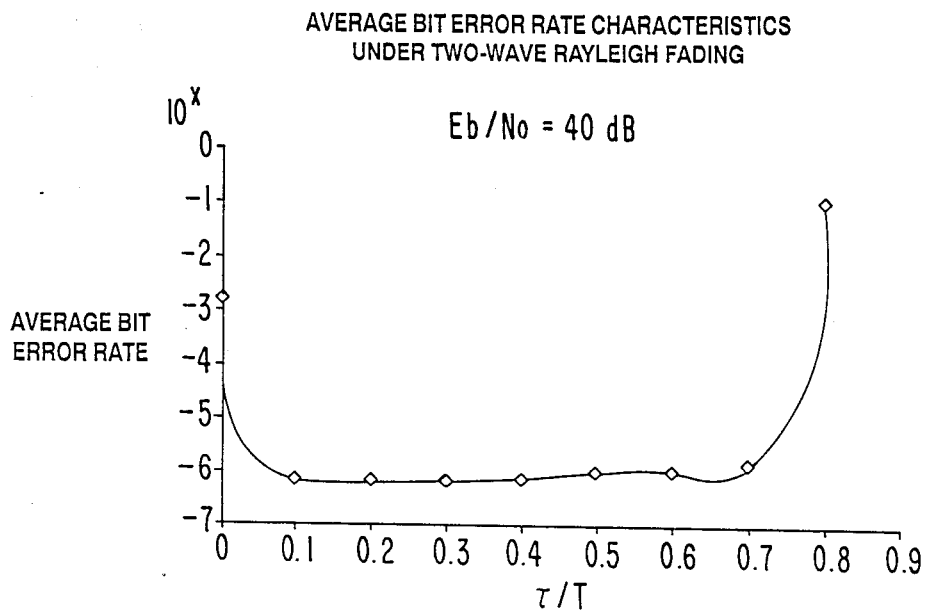
Figure 35:
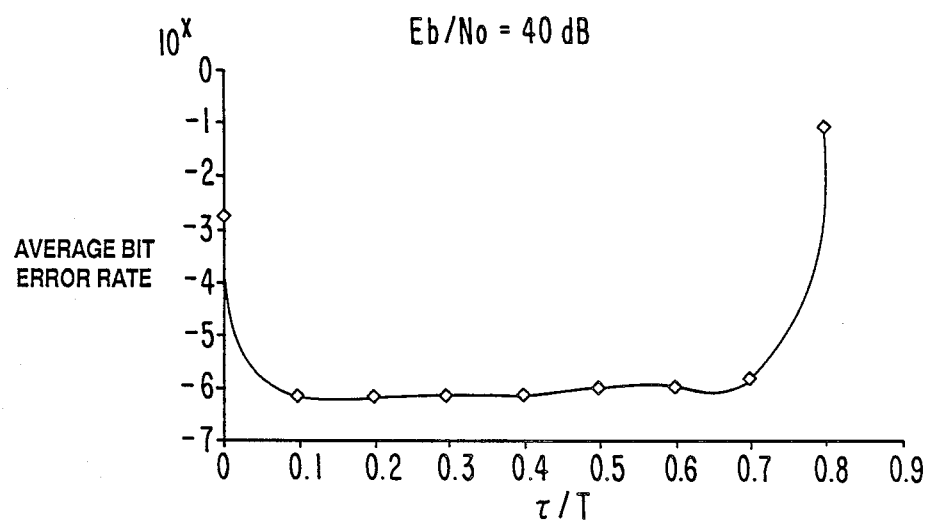

FIGS. 34 and 35 show average bit error rate characteristics for the quadrature-phase system with respect to the delay time difference $\tau$ with the time-slot phase transition waveforms being triangular and raised cosine waveforms as shown in FIGS. 15 and 18. The bit error rates are similarly improved up to about $\tau/T=0.7$. In each of FIGS. 34 and 35, the maximum value of phase transition in the time slots is $\pi$, and the characteristics are degraded below this value and are not virtually improved above this value.

In this embodiment, as described above, the bit error rate characteristics can be improved to a large extent in the presence of multipath fading by employing a transmission signal having a phase transition waveform in each of time slots of data, the time-slot phase transition waveform having a varying rate of change of phase or a phase jump, the time-slot phase transition waveform in any desired time slot and the time-slot phase transition waveform in a time slot which comes prescribed time slots subsequent to the desired time slot being identical to each other in shape irrespective of information to be transmitted, the information to be transmitted being present in a phase difference between same positions of the phase transition waveforms in the time slots that are spaced apart from each other by the prescribed time slots. The spectrum utilization efficiency is increased by multiphase transmission as compared with DSK described above as the second conventional method. By selecting time-slot phase transition waveforms, bit error rate characteristics can be improved even with respect to multipath fading having a larger delay time difference.

A second embodiment of the present invention will hereinafter be described with respect to FIG. 36.

Figure 36:
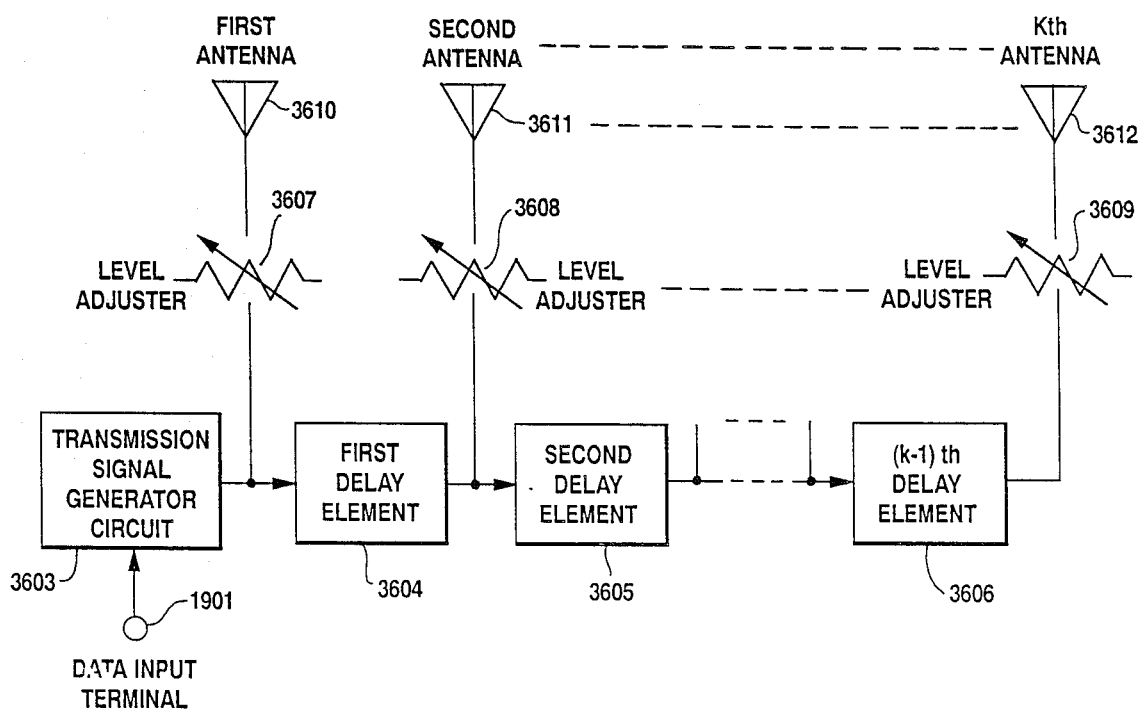
FIG. 36 is a block diagram of a transmitter circuit according to a second embodiment of the present invention.
Figure 37:
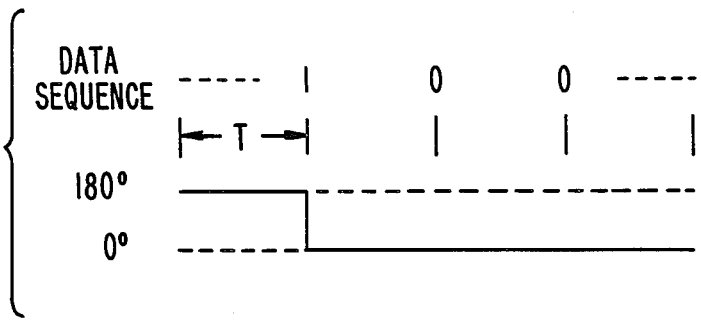
FIG. 37 is a phase transition waveform diagram showing the phase transition of a transmission signal transmitted by a first conventional digital signal transmission method.
Figure 38:
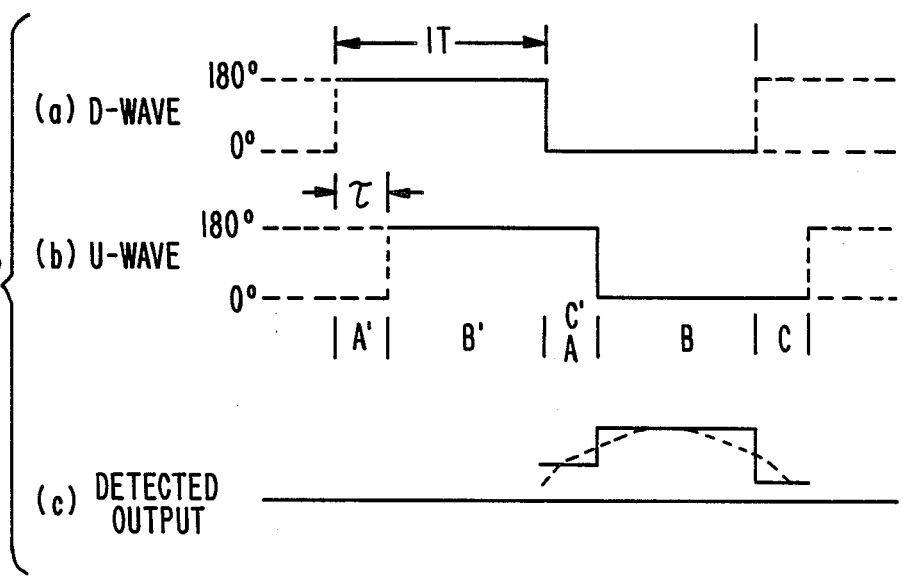
FIG. 38 is a diagram explaining a detected output signal in the presence of a two-wave multipath propagation in the first conventional digital signal transmission method.
Figure 39:
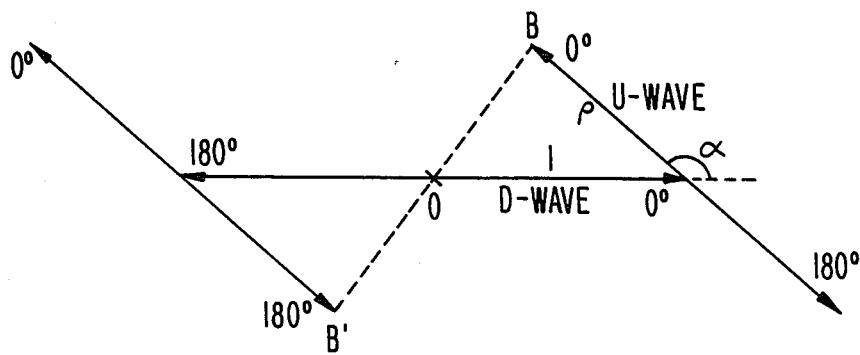
FIG. 39 is a vector diagram illustrating the combined phase of D- and U-waves in order to determine the detected output in FIG. 38.
Figure 40:
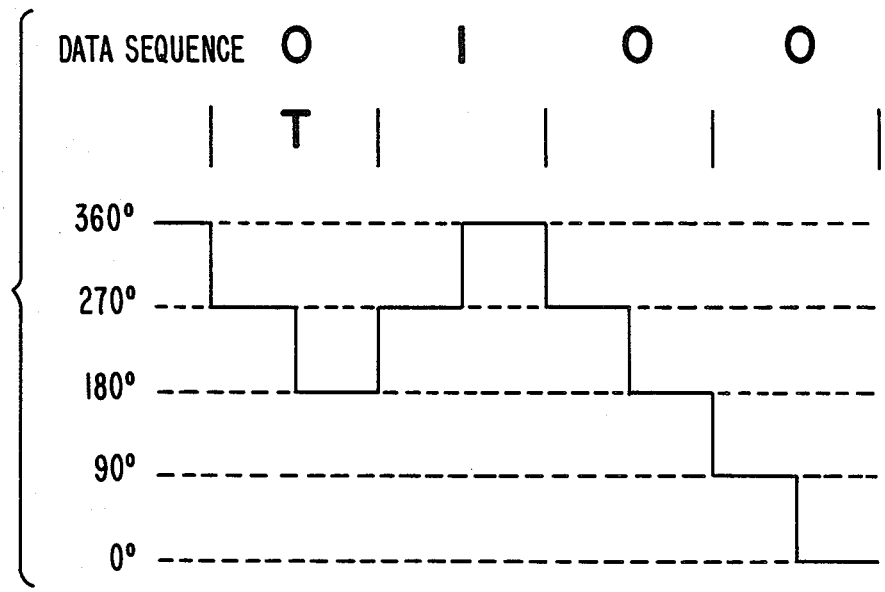
FIG. 40 is a phase transition waveform diagram showing the phase transition of a transmission signal transmitted by a second conventional digital signal transmission method.
Figure 41:
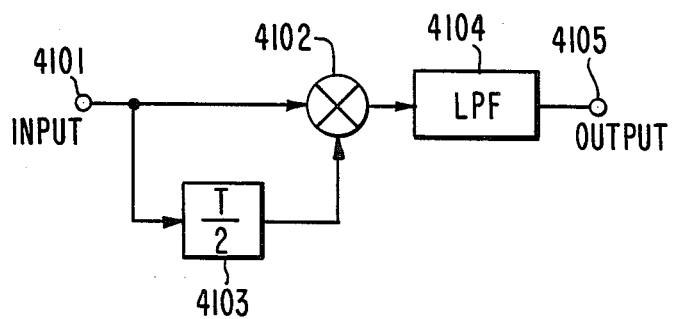
FIG. 41 is a block diagram of a detector in the second conventional digital signal transmission method.
Figure 42:
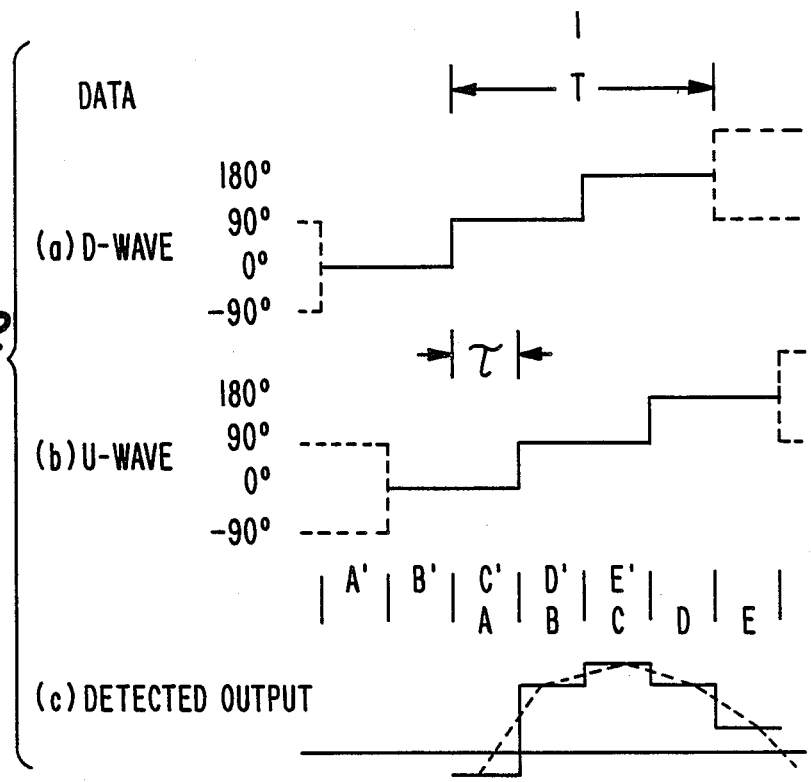
FIG. 42 is a diagram explaining a detected output signal in the presence of two-wave multipath in the second conventional digital signal transmission method.
Figure 43:
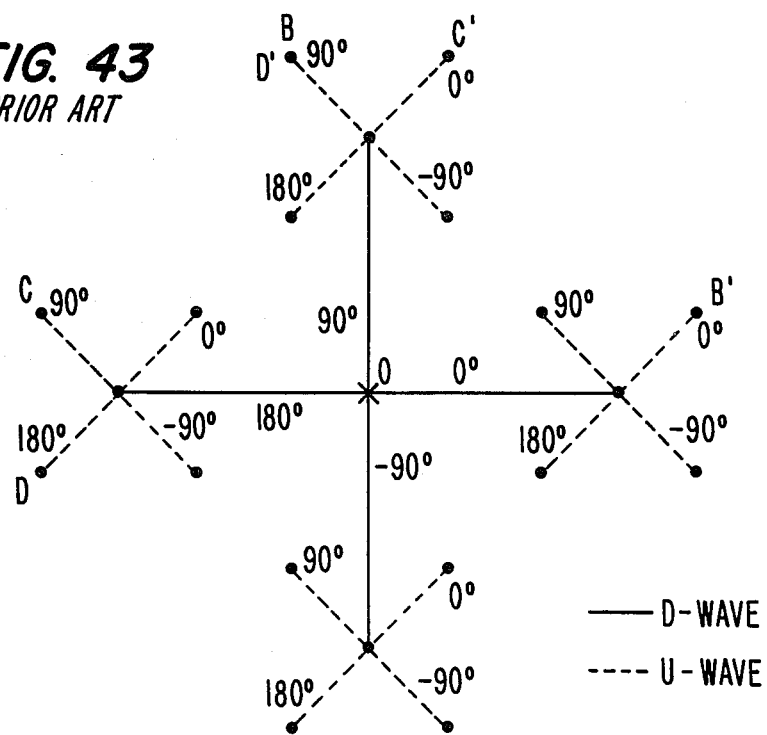
FIG. 43 is a vector diagram illustrating the combined phase of D- and U-waves in order to determine the detected output in FIG. 42.

FIG. 36 shows a transmitter circuit in a digital signal transmission method according to a second embodiment of the present invention. Denoted in FIG. 36 at 1901 is a data input terminal; element 3603 is a transmission signal generator circuit; the data input terminal 1901 and the transmission signal generator circuit 3603 are identical to those in the first embodiment shown in FIG. 19; elements 3610 through 3612 are first through kth antennas of a k system; elements 3607 through 3609 are level adjusters of the k system, and elements 3604 through 3606 are first through (k−1)th delay elements of a k−1 system. The level adjusters 3607 through 3609 may also have an amplification capability. As a detecting method at the receiving end, n time-slot differential detection as shown in FIGS. 24 through 26 according to the first embodiment is employed.

The digital signal transmission method according to the aforesaid arrangement will hereinafter be described with reference to FIGS. 27, 32 through 36, and the equation (18).

FIGS. 32 through 35 show bit error rate characteristics, as described above, for the transmission signal which is produced by the transmission signal generator circuit 3603, propagated through two-wave Raileigh fading paths having the delay time difference $\tau$, and then received and detected. Now, it is assumed that the delay time difference $\tau$ of the propagation paths, i.e., delay spread, is smaller than the time slot interval T. This condition is applied to the case where the delay spread is small as in a building, or the transmission rate is low. When $\tau/T$ is close to 0, e.g., where the time-slot phase transition waveforms $\psi(t)$ are of a stepped pattern, the region C in FIG. 27 is reduced. Where $\psi(t)$ is of a general waveform, the lefthand side of the equation (18) varies to a smaller extent as z varies. This results in elimination of the diversity effect which would be produced by combining different detected outputs as described with reference to the first embodiment. As a consequence, as $\tau/T$ approaches 0 in FIGS. 32 through 35, the bit error rate characteristics are less improved. But, by giving, at the transmitting end, a delay in the range of from 0 to 0.5 or from 0 to 0.7, which is the improving range for $\tau/T$, the bit error rate characteristics can be improved.

The delay elements 3604 through 3606 shown in FIG. 36 serve to give such a delay in the transmitting end. The delay elements should be designed to set, to $\tau_m/T$, the time difference $\tau_m$ between a wave arriving first and a wave arriving last at the receiving end, including a delay due to the difference in paths from the respective antennas, so that the delay will not exceed 0.5 or 0.7, which is the maximum improving range for $\tau/T$ that is determined by the time-slot phase transition waveforms $\psi(t)$. The level adjusters 3607 through 3609 serve to substantially equalize, at the receiving point, the average levels of waves accompanied by fading and coming from the respective antennas. The first through kth antennas are required to be located at spaced intervals or be composed of antennas having different planes of polarization such that the fadings of the respective paths from the antennas to the receiving point are mutually uncorrelated. One simplest and most effective arrangement is the case in which k=2. In this case, the time difference $\tau_m$ between waves arriving from two antennas is preferably selected to be 0.2 to 0.4 in terms of $\tau_m/T$, which is the best point of an bit error rate determined by the time-slot phase transition waveform $\psi(t)$.

With the second embodiment of the present invention, as described above, one transmission signal is transmitted with a time delay from different antannas for thereby obtaining a diversity effect even when $\tau/T$ is small, so that the bit error rate characteristics can be improved. The diversity is highly effective in reducing the size of a receiver and making it portable since only one antenna is required on the reciever.

What is claimed:

1. A method of transmitting a digital signal, employing, in a transmission apparatus for transmitting digital data, a transmission signal having phase transition waveforms in respective continuous time slots of data, each phase transition waveform in each of the time slots having a varying rate of change of phase or at least one phase jump, wherein phase transition waveforms in any two time slots which are spaced apart from each other on a time axis by a prescribed number of time slots are identical to each other in shape irrespective of an information to be transmitted, the information to be transmitted being present in a phase difference between the phase transition waveforms in any two time slots spaced apart from each other on a time axis by the prescribed number of time slots.

2. A method according to claim 1, wherein the phase transition waveform in each of the time slots is a raised cosine waveform.

3. A method according to claim 1, wherein the phase transition waveform in each of the time slots is a Gaussian waveform.

4. A method according to claim 1, wherein said phase difference is any one of angles obtained by equally dividing $2\pi$ by a number which is a power of 2.

5. A method according to claim 1, wherein said transmission signal is delayed and transmitted from a plurality of different antennas each with a time delay.

6. A method according to claim 1, wherein said transmission signal is detected by differential detection using a delay line capable of producing a delay corresponding to said prescribed number of time slots.

7. A method according to claim 1, wherein said phase transition waveform in each of the time slots is of a stepped pattern having at least one phase jump.

8. A method according to claim 7, wherein said stepped pattern has a plurality of phase jumps.

9. A method according to claim 7, wherein said stepped pattern has a single phase jump.

10. A method according to claim 9, wherein the phase jump occurs at the same position in each of the time slots.

11. A method according to claim 10, wherein the phase jump occurs at a center position in each of the time slots.

12. A method according to claim 9, wherein the phase jump in each of the time slots occurs at one of a plurality of kinds of positions.

13. A method according to claim 9, wherein the amount of the phase jump is $\pi$.

14. A method according to claim 9, wherein the direction of the phase jump is the same which is leading or lagging, and the amount of the phase jump is the same, in all of the time slots.

15. A method according to claim 9, wherein the direction of the phase jump is the same which is leading or lagging in all of the time slots, and the amount of the phase jump in each of the time slots is one of a plurality of kinds of amounts.

16. A method according to claim 9, wherein the direction of the phase jump is alternately leading and lagging in each adjacent two of the time slots, and the amount of the phase jump is the same in all of the time slots.

17. A method according to claim 9, wherein the direction of the phase jump is alternately leading and lagging in each adjacent two of the time slots, and the amount of the phase jump in each of the time slots is one of a plurality of kinds of amounts.

18. A method according to claim 1, wherein the phase transition waveform in each of the time slots is composed of a plurality of straight lines of different gradients.

19. A method according to claim 18, wherein said gradients are of two kinds.

20. A method according to claim 18, wherein said gradients, i.e., frequencies, are of three kinds or more.

21. A method according to claim 18, wherein said phase transition waveform in each of the time slots has a phase jump.

22. A method according to claim 18, wherein said phase transition waveform in each of the time slots changes phase continuously.

* * * * *